United States Patent
Kim et al.

(10) Patent No.: US 10,015,411 B2
(45) Date of Patent: Jul. 3, 2018

(54) DIGITAL DEVICE AND DRIVER MONITORING METHOD THEREOF

(71) Applicant: LG ELECTRONICS INC., Seoul (KR)

(72) Inventors: Kwanhyung Kim, Seoul (KR); Youngman Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 600 days.

(21) Appl. No.: 14/704,553

(22) Filed: May 5, 2015

(65) Prior Publication Data

US 2016/0248957 A1 Aug. 25, 2016

(30) Foreign Application Priority Data

Feb. 25, 2015 (KR) ........................ 10-2015-0026305

(51) Int. Cl.
*H04N 5/235* (2006.01)
*H04N 5/225* (2006.01)
(Continued)

(52) U.S. Cl.
CPC ............ *H04N 5/2354* (2013.01); *B60K 28/02* (2013.01); *G06K 9/00845* (2013.01);
(Continued)

(58) Field of Classification Search
CPC .. H04N 5/2354; H04N 5/2351; H04N 5/2256; H04N 5/235; H04N 5/247;
(Continued)

(56) References Cited

U.S. PATENT DOCUMENTS

| 5,008,946 A | 4/1991 | Ando |
| 5,689,241 A | 11/1997 | Clarke, Sr. et al. |

(Continued)

FOREIGN PATENT DOCUMENTS

| CN | 102030232 A | 4/2011 |
| CN | 103594003 A | 2/2014 |

(Continued)

OTHER PUBLICATIONS

Murphy-Chutorian et al., "Head Pose Estimation for Driver Assistance Systems: A Robust Algorithm and Experimental Evaluation," Proceedings of the 2007 IEEE, Intelligent Transportation Systems Conf., Seattle, WA, USA, WeA1.4, Sep. 30-Oct. 3, 2007, pp. 709-714, XP031151548.

*Primary Examiner* — Christopher S Kelley
*Assistant Examiner* — Matthew Kwan
(74) *Attorney, Agent, or Firm* — Birch, Stewart, Kolasch & Birch, LLP

(57) ABSTRACT

A method of monitoring a driver including obtaining images from the first and second camera unit, checking whether a brightness of the image obtained from the first camera unit is equal to or greater than a reference value or whether the driver is detected from the image obtained from the second camera unit, if the brightness of the image obtained from the first camera unit is not equal to or greater than the reference value or the driver is not detected from the image obtained from the second camera unit, obtaining a first comparative image from the first camera unit by turning off the second illumination unit and a second comparative image from the first camera unit by turning on the second illumination unit, checking whether a difference value between a brightness of the obtained first comparative image and a brightness of the obtained second comparative image is equal to or greater than a reference difference value, and if the difference value between the brightness of the obtained f comparative image (Continued)

and the brightness of the obtained second comparative image is not equal to or greater than the reference difference value, turning off the second illumination unit.

20 Claims, 17 Drawing Sheets

(51) Int. Cl.
| | | |
|---|---|---|
| *G06K 9/00* | (2006.01) | |
| *H04N 7/18* | (2006.01) | |
| *B60K 28/02* | (2006.01) | |
| *G06K 9/20* | (2006.01) | |
| *G08B 21/06* | (2006.01) | |
| *H04N 5/247* | (2006.01) | |
| *G08B 29/18* | (2006.01) | |

(52) U.S. Cl.
CPC ......... *G06K 9/2027* (2013.01); *H04N 5/2256* (2013.01); *H04N 5/2351* (2013.01); *B60K 2350/00* (2013.01); *G08B 21/06* (2013.01); *G08B 29/18* (2013.01); *H04N 5/235* (2013.01); *H04N 5/247* (2013.01)

(58) Field of Classification Search
CPC .. G06K 9/2027; G06K 9/00845; B60K 28/02; B60K 2350/00; G08B 29/18; G08B 21/06
USPC .......................................................... 348/77
See application file for complete search history.

(56) References Cited

U.S. PATENT DOCUMENTS

| | | | |
|---|---|---|---|
| 5,801,763 A | 9/1998 | Suzuki | |
| 6,443,603 B1* | 9/2002 | Eberhardt | B60Q 1/085 |
| | | | 362/464 |
| 6,504,476 B1* | 1/2003 | Wallrafen | B60Q 1/1423 |
| | | | 307/10.8 |
| 6,920,234 B1 | 7/2005 | Koenig et al. | |
| 2003/0209893 A1* | 11/2003 | Breed | B60J 10/00 |
| | | | 280/735 |
| 2004/0056975 A1* | 3/2004 | Hata | G02B 7/28 |
| | | | 348/371 |
| 2008/0079568 A1* | 4/2008 | Primous | H05B 37/0218 |
| | | | 340/541 |
| 2012/0150387 A1 | 6/2012 | Watson et al. | |
| 2012/0188355 A1 | 7/2012 | Omi et al. | |
| 2015/0287206 A1* | 10/2015 | Ebisawa | A61B 3/111 |
| | | | 382/154 |

FOREIGN PATENT DOCUMENTS

| | | |
|---|---|---|
| DE | 19603287 A1 | 1/1997 |
| DE | 19921488 A1 | 11/2000 |
| DE | 102012201071 A1 | 7/2012 |
| EP | 1655687 A2 | 5/2006 |
| EP | 2857939 A1 | 4/2015 |
| KR | 10-0990305 B1 | 10/2010 |
| WO | WO 2013/176265 A1 | 11/2013 |

\* cited by examiner

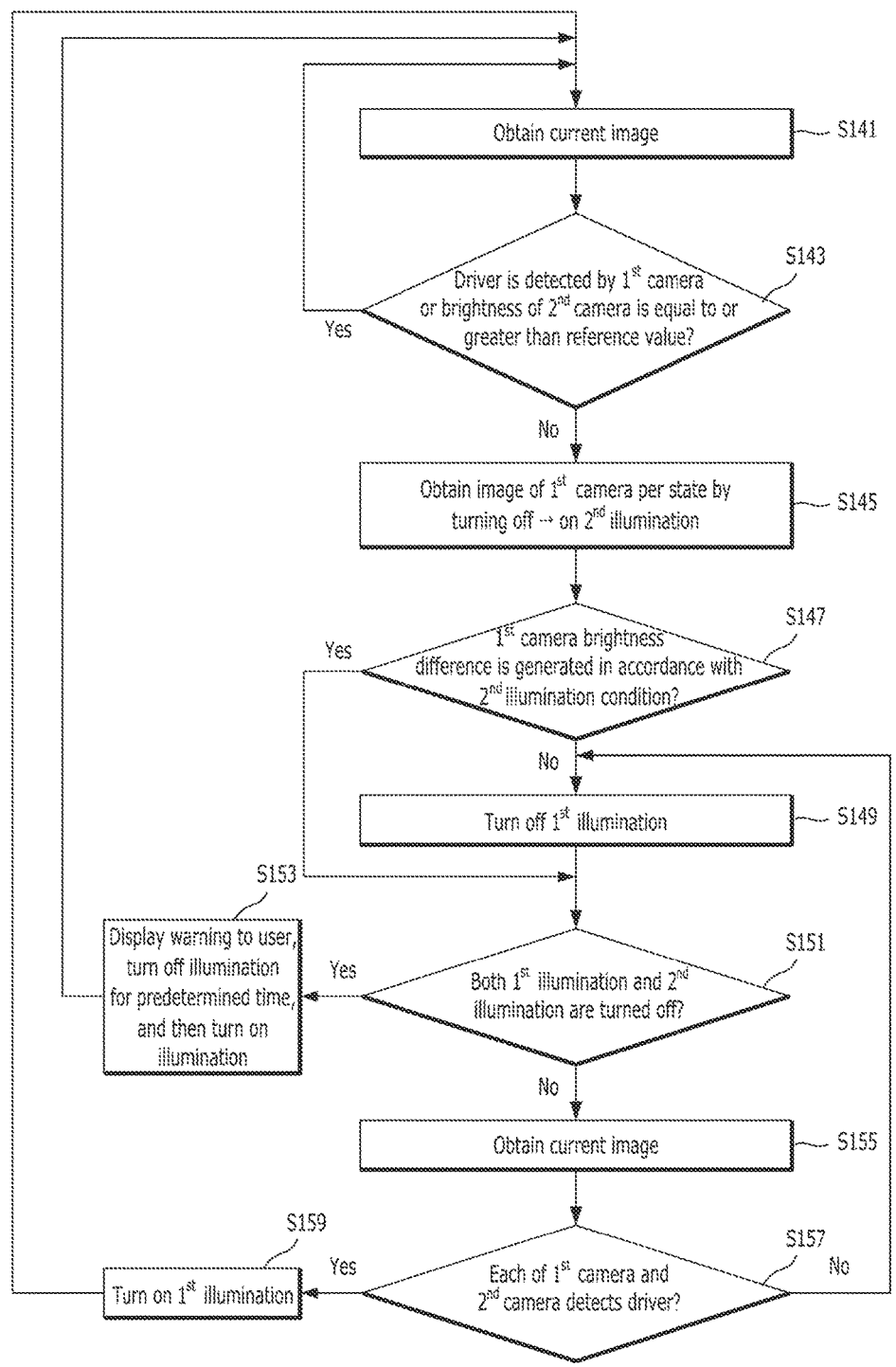

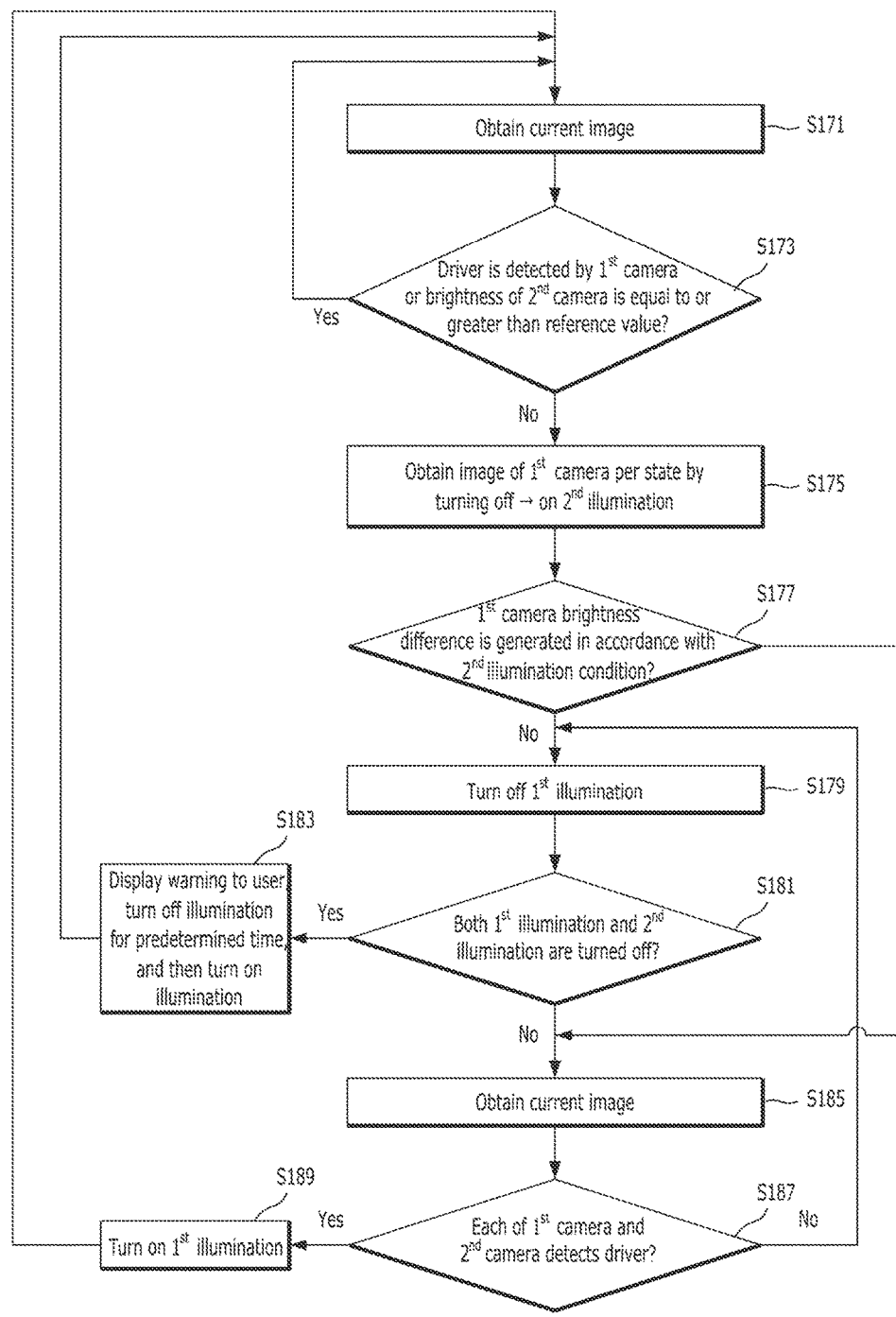

DIGITAL DEVICE AND DRIVER MONITORING METHOD THEREOF

This application claims priority under 35 U.S.C. § 119 to Korean Application No. 10-2015-0026305, filed on Feb. 25, 2015 which are hereby incorporated in its entirety by reference as if fully set forth herein.

BACKGROUND OF THE INVENTION

Field of the Invention

The present invention relates to a digital device, and more particularly, to a digital device and driver monitoring method thereof. Although the present invention is suitable for a wide scope of applications, it is particularly suitable for detecting a state of the driver.

Discussion of the Related Art

Recently, the needs for a technology of monitoring a state of a driver by installing a camera in a vehicle are increasingly rising. A technology of monitoring a driver is the technology of obtaining various kinds of driver information and the like using a parallax between a camera and an infrared illumination disposed on both sides of the driver, respectively.

In this instance, the infrared illumination is used in general. The reason for this is to prevent the driver from recognizing a presence of an illumination. However, when using the infrared illumination and a driver approaches the infrared illumination, if a distance between driver's eyes and the infrared illumination is too small, the driver's eyes may be damaged.

In order to prevent such a problem, if the driver approaches within a predetermined distance, the infrared illumination is turned off using additional parts including a distance sensor and the like. However, this raises the overall cost of materials. Moreover, when employing the above technology, an object other than the driver approaches the infrared illumination, since it is recognized that the driver is approaching, the infrared illumination is turned off. Hence, such a technology raises an error rate of driver recognition. Thus, since additional auxiliary methods are further required, it becomes another factor of the material cost increase.

SUMMARY OF THE INVENTION

Accordingly, embodiments of the present invention are directed to a digital device and driver monitoring method thereof that substantially obviate one or more problems due to limitations and disadvantages of the related art.

One object of the present invention is to provide a digital device and driver monitoring method thereof, by which a state of a driver can be detected.

Technical tasks obtainable from the present invention are non-limited by the above-mentioned technical tasks. Further, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, in a digital device including a first illumination unit, a second illumination unit, a first camera unit and a second camera unit, a method of monitoring a driver according to an embodiment of the present invention may include the steps of obtaining images from the first camera unit and the second camera unit, checking whether a brightness of the image obtained from the first camera unit is equal to or greater than a reference value or whether the driver is detected from the image obtained from the second camera unit, if the brightness of the image obtained from the first camera unit is not equal to or greater than the reference value or the driver is not detected from the image obtained from the second camera unit, obtaining a first comparative image from the first camera unit by turning off the second illumination unit and a second comparative image from the first camera unit by turning on the second illumination unit, checking whether a difference value between a brightness of the obtained first comparative image and a brightness of the obtained second comparative image is equal to or greater than a reference difference value, and if the difference value between the brightness of the obtained first comparative image and the brightness of the obtained second comparative image is not equal to or greater than the reference difference value, turning off the second illumination unit.

In another aspect of the present invention, as embodied and broadly described herein, a digital device according to an embodiment of the present invention may include a first illumination unit configured to generate a first light, a second illumination unit configured to generate a second light, a first camera unit configured to obtain a first image, a second camera unit configured to obtain a second image, and a control unit primarily checking whether a brightness of an image obtained from the first camera unit is equal to or greater than a reference value or whether a driver is detected from an image obtained from the second camera unit, the control unit, if the brightness of the image obtained from the first camera unit is not equal to or greater than the reference value or if the driver is not detected from the image obtained from the second camera unit, secondarily checking whether a difference value between a brightness of a first comparative image obtained from the first camera unit by turning off the second illumination unit and a brightness of a second comparative image obtained from the first camera unit by turning on the second illumination unit is equal to or greater than a reference difference value, the controller, if the difference value between the brightness of the obtained first comparative image and the brightness of the obtained second comparative image is not equal to or greater than the reference difference value, controlling the first illumination unit, the second illumination unit, the first camera unit and the second camera unit to turn off the second illumination unit.

Effects obtainable from the present invention may be non-limited by the above mentioned effect. Further, other unmentioned effects can be clearly understood from the following description by those having ordinary skill in the technical field to which the present invention pertains.

Both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 16 is a flowchart to describe driver monitoring method of a digital device according to a fifth embodiment of the present invention; and FIG. 17 is a flowchart to describe driver monitoring method of a digital device according to a sixth embodiment of the present invention.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
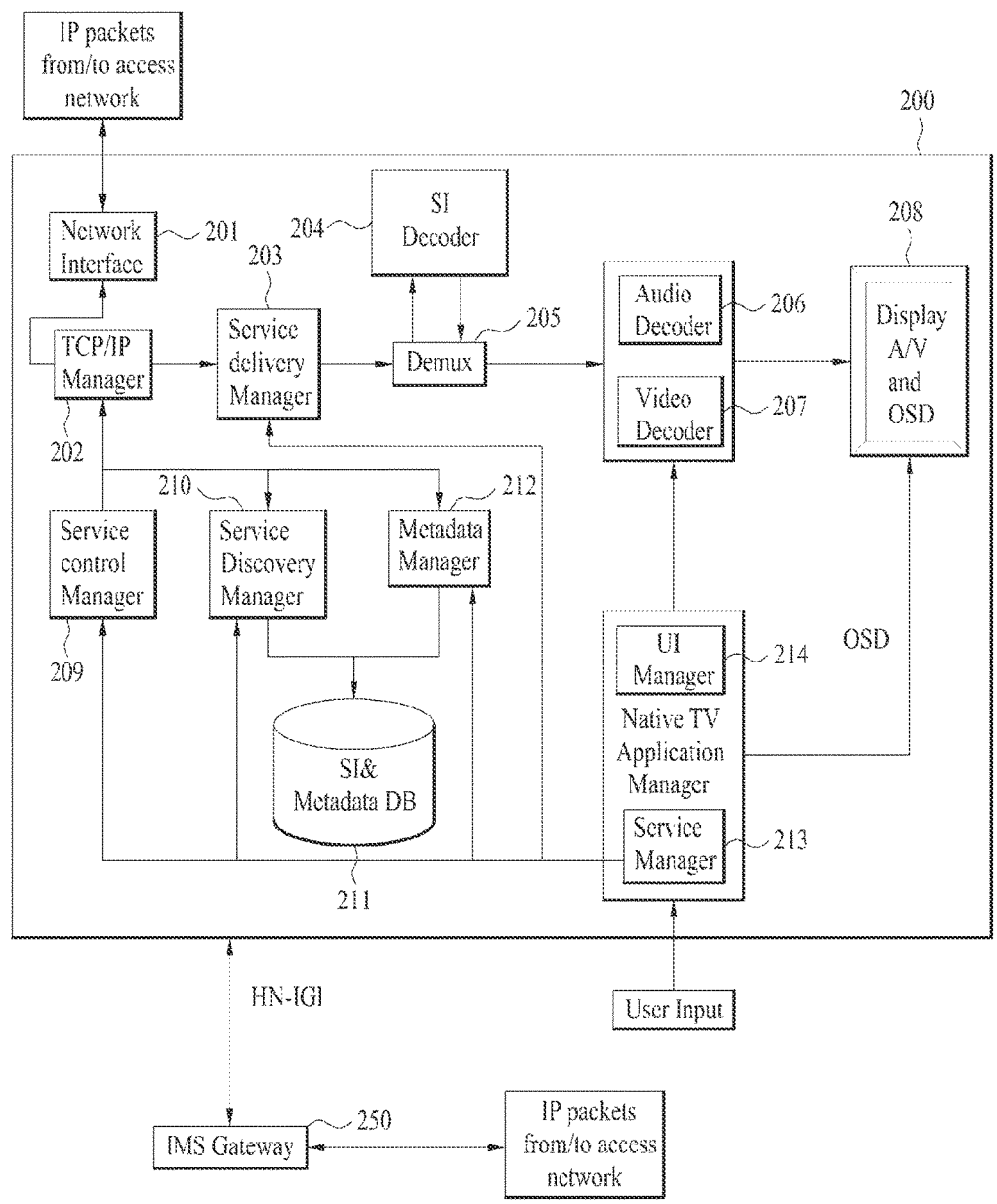
FIG. 1 is a block diagram illustrating a configuration to describe a digital device according to one embodiment of the present invention.

In the following description, various embodiments according to an embodiment of the present invention are explained with reference to attached drawings. In particular, FIG. 1 is a schematic diagram of a digital receiver 200 according to an embodiment of the present invention.

The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted based on the RTP, according to the RTP and transmits the parsed data packet to the demultiplexer 205 or store the parsed data packet in the SI & metadata DB 211 under the control of the service manager 213. The service delivery manager 203 can feed back network reception information to the server based on the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc. The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers. The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212. The service manager 213 may configure a channel map and enable channel control at the request of the user based on the channel map. The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service. Further, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this instance, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process based on a position variation of the first result. In this instance, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result based on the coordinate information and perform the second process based on the position of the first result.

The service discovery manager 210 may provide information required to select a service provider that provides a service. Upon receipt of a signal for selecting a channel from the service manager 213, the service discovery manager 210 discovers a service based on the received signal. The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211. The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data. An IMS (IP Multimedia Subsystem) gateway 250 may include functions required to access an IMS based IPTV services.

Figure 2:
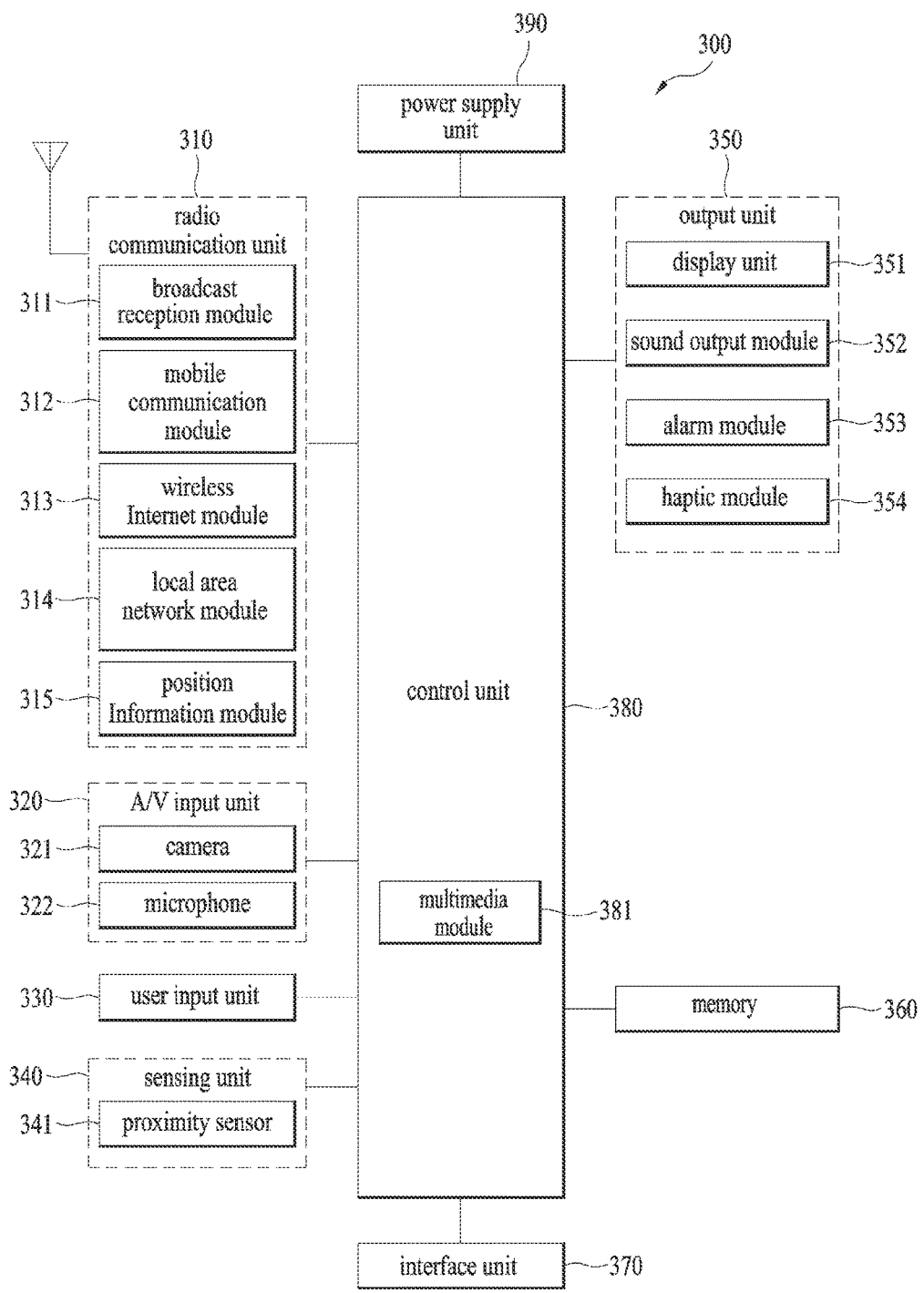
FIG. 2 is a block diagram illustrating a configuration to describe a digital device according to another embodiment of the present invention.

FIG. 2 is a block diagram of a mobile terminal in accordance with an embodiment of the present invention. With reference to FIG. 2, the mobile terminal 300 includes a wireless communication unit 310, an A/V (audio/video) input unit 320, a user input unit 330, a sensing unit 340, an output unit 350, a memory 360, an interface unit 370, a controller 380, and a power supply unit 390. FIG. 2 shows the mobile terminal 300 having various components, but implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems. The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

With continued reference to FIG. 2, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355. The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this instance, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size. If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 2, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. Further, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence.

The haptic module 354 can generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 can perform a pattern (or image) recognizing process for recognizing a writing input and a picture drawing input performed on the touch screen as characters or images, respectively. The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 3:
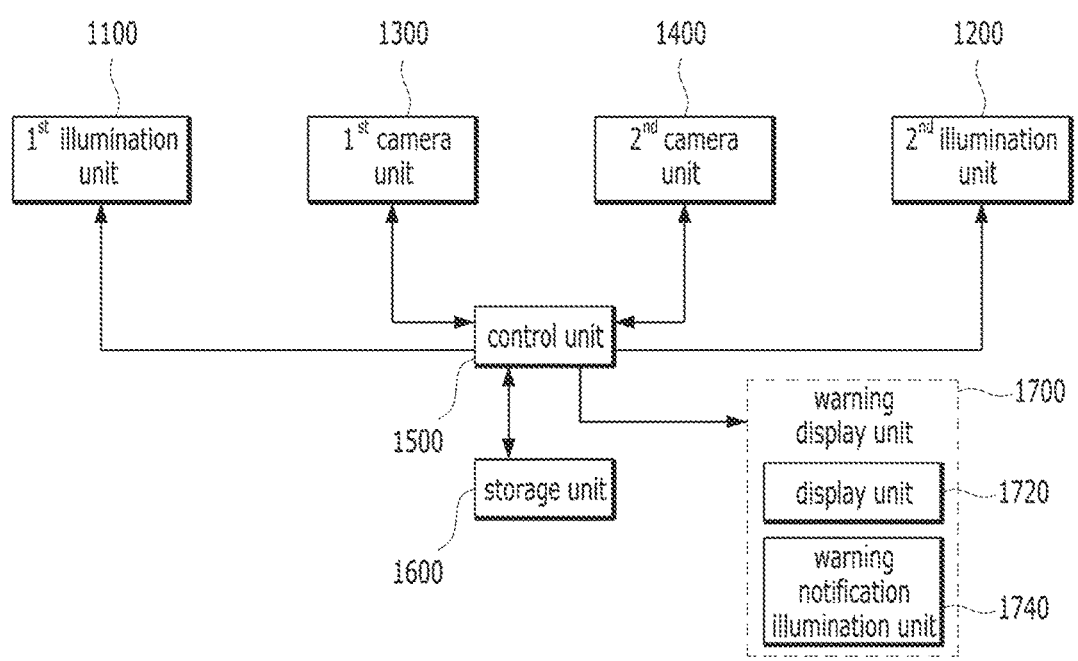
FIG. 3 is a block diagram illustrating a configuration of a driver monitoring device of a digital device according to an embodiment of the present invention.

FIG. 3 is a block diagram illustrating a configuration of a driver monitoring device of a digital device according to an embodiment of the present invention. Referring to FIG. 3, the driver monitoring device includes a first illumination unit 1100, a second illumination unit 1200, a first camera unit 1300, a second camera unit 1400 and a control unit 1500. Additionally, the driver monitoring device includes a storage unit 1600 and a warning display unit 1700.

In particular, the first illumination unit 1100 generates a first light and the second illumination unit 1200 generates a second light. Each of the first light generated from the first illumination unit 1100 and the second light generated from the second illumination unit 1200 may include a light in an infrared wavelength range. An intensity of the first light generated from the first illumination unit 1100 may be equal to that of the second light generated from the second illumination unit 1200.

In this instance, the first illumination unit 1100 and the second illumination unit 1200 may be disposed by being symmetric to each other with reference to a location of the driver's eyes. A distance between the first illumination unit 1100 and the driver's eyes may be equal to that between the second illumination unit 1200 and the driver's eyes. In some cases, the intensity of the first light generated from the first illumination unit 1100 may be different from that of the second light generated from the second illumination unit 1200.

Although the first illumination unit 1100 and the second illumination unit 1200 are disposed by being symmetric to each other, the distance between the first illumination unit 1100 and the driver's eyes may be different from the distance between the second illumination unit 1200 and the driver's eyes. For instance, if the distance between the first illumination unit 1100 and the driver's eyes is greater than the distance between the second illumination unit 1200 and the driver's eyes, the intensity of the first light generated from the first illumination unit 1100 may be greater than that of the second light generated from the second illumination unit 1200.

The first camera unit 1300 can obtain a first image and the second camera unit 1400 can obtain a second image. In this instance, the first camera unit 1300 may be disposed nearby the first illumination unit 1100 and the second camera unit 1400 may be disposed nearby the second illumination unit 1200. In particular, the first camera unit 1300 and the second camera unit 1400 may be disposed by being symmetric to each other with reference to the location of the driver's eyes.

A distance between the first camera unit 1300 and the driver's eyes may be equal to a distance between the second camera unit 1400 and the driver's eyes. The first camera unit 1300 and the first illumination unit 1100 may be disposed by being paired with each other. The first camera unit 1300 and the first illumination unit 1100 may be manufactured as different modules, respectively. The first camera unit 1300 and the first illumination unit 1100 may be manufactured as a single module.

The second camera unit 1400 and the second illumination unit 1200 may be disposed by being paired with each other. The second camera unit 1400 and the second illumination unit 1200 may be manufactured as different modules, respectively. The second camera unit 1400 and the second illumination unit 1200 may be manufactured as a single module. For instance, the first illumination unit 1100 and the first camera unit 1300 may be configured with a first module, while the second illumination unit 1200 and the second camera unit 1400 may be configured with a second module.

In some cases, the first illumination unit 1100 is configured with a first module, the first camera unit 1300 is configured with a second module, the second illumination unit 1200 is configured with a third module, and the second camera unit 1400 is configured with a fourth module. Meanwhile, the control unit 1500 can primarily check whether a brightness of the image obtained from the first camera unit 1300 is equal to or greater than a reference value or whether the driver is detected from the image obtained from the second camera unit 1400.

If the brightness of the image obtained from the first camera unit 1300 is not equal to or greater than the reference value or the driver is not detected from the image obtained from the second camera unit 1400, the control unit 1500 can secondarily check whether a difference value between the brightness of a first comparative image obtained from the first camera unit 1300 by turning off the second illumination unit 1200 and a second comparative image obtained from the first camera unit 1300 by turning on the second illumination unit 1200 is equal to or greater than a reference difference value.

In addition, if the difference value between the brightness of the obtained first comparative image and the brightness of the obtained second comparative image is not equal to or greater than the reference difference, the control unit 1500 can control the first illumination unit 1100, the second illumination unit 1200, the first camera unit 1300 and the second camera unit 1400 to turn off the second illumination unit 1200.

Moreover, when the control unit 1500 obtains the first comparative image from the first camera unit 1300 by turning off the second illumination unit 1200 and also obtains the second comparative image from the first camera unit 1300 by turning on the second illumination unit 1200, the control unit 1500 can control a timing point of turning off the second illumination unit 1200 and a timing point of turning on the second illumination unit 1200 to have a predetermined time interval.

In this instance, the reason for the timing point of turning off the second illumination unit 1200 and the timing point of turning on the second illumination unit 1200 to have the predetermined time interval is to enable the first camera unit 1300 to have a time for obtaining the first comparative image.

After the control unit 1500 has turned off the second illumination unit 1200, the control unit 1500 checks whether both of the first illumination unit 1100 and the second illumination unit 1200 are turned off. If both of the first illumination unit 1100 and the second illumination unit 1200 are turned off, the control unit 1500 displays a warning to a driver and can control both of the first illumination unit 1100 and the second illumination unit 1200 to be turned on.

Further, the control unit 1500 can turn on both of the first illumination unit 1100 and the second illumination unit 1200 after the elapse of a predetermined time from a timing point of displaying the warning to the driver. In particular, the reason for the first illumination unit 1100 and the second illumination unit 1200 to be turned on after the elapse of the predetermined time from the timing point of displaying the warning to the driver is to give a reset time for restarting a driver monitoring algorithm from the beginning.

After the control unit 1500 has turned off the second illumination unit 1200, the control unit 1500 checks whether both of the first illumination unit 1100 and the second illumination unit 1200 are turned off. If both of the first illumination unit 1100 and the second illumination unit 1200 are not turned off, the control unit 1500 obtains images from the first camera unit 1300 and the second camera unit 1400.

In addition, the control unit 1500 checks whether the driver is detected from each of the images obtained from the first camera unit 1300 and the second camera unit 1400. If the driver is detected from each of the images obtained from the first camera unit 1300 and the second camera unit 1400, the control unit 1500 can control the second illumination unit 1200 to be turned on. Further, if the driver is not detected from each of the images obtained from the first camera unit 1300 and the second camera unit 1400, the control unit 1500 can control the second illumination unit 1200 to be turned off.

Meanwhile, if the difference value between the brightness of the obtained first comparative image and the brightness of the obtained second comparative image is equal to or greater than the reference difference, the control unit 1500 checks whether both of the first illumination unit 1100 and the second illumination unit 1200 are turned off. If both of the first illumination unit 1100 and the second illumination unit 1200 are turned off, the control unit 1500 displays a warning to the driver and can control both of the first illumination unit 1100 and the second illumination unit 1200 to be turned on.

If the difference value between the brightness of the obtained first comparative image and the brightness of the obtained second comparative image is equal to or greater than the reference difference, the control unit 1500 obtains images from the first camera unit 1300 and the second camera unit 1400 and then checks whether the driver is detected from each of the images obtained from the first camera unit 1300 and the second camera unit 1400. If the driver is detected from each of the images obtained from the first camera unit 1300 and the second camera unit 1400, the control unit 1500 can control the second illumination unit 1200 to be turned on.

Meanwhile, a reference value for an image brightness and a reference difference value are set in advance and can be then saved in the storage unit 1600. In some cases, the driver may change the reference value for the image difference and the reference difference value, which are saved in the storage unit 1600 in advance. Further, if the driver changes the reference value for the image brightness and the reference difference value, the control unit 1500 of the digital device may additionally provide a change setting window through the display unit 1720.

In this instance, the reference value for the image brightness may be determined depending on an internal vehicle environment of the driver. For instance, when the sun sets or the weather is cloudy, if the internal vehicle environment of the driver gets dark, an image brightness is detected by relatively lowering a reference value for the image brightness. In another instance, when the sun rises or the weather is sunny, if the internal vehicle environment of the driver gets bright, an image brightness is detected by relatively raising a reference value for the image brightness.

As both of the first illumination unit 1100 and the second illumination unit 1200 are turned off, if an abnormal error is discovered, the warning display unit 1700 can display a warning to the driver in response to a control signal of the control unit 1500. In this instance, the warning display unit 1700 may include a display unit 1720 and a warning notification illumination unit 1740. For instance, the warning display unit 1700 can perform the warning display by at least one of a first method of creating a warning message and then displaying the created warning message on the display unit 1720 and a second method of turning on/off a warning notification illumination of the warning notification illumination unit 1740 continuously for a predetermined time.

Thus, the digital device of the present invention may monitor a driver's state by being installed on a vehicle. Alternatively, the digital device of the present invention may monitor a user's state by being installed on a general digital device or the like. The present invention primarily analyzes the obtained images using the first illumination unit 1100, the second illumination unit 1200, the first camera unit 1300 and the second camera unit 1400 and then secondarily analyzes a comparative image obtained by turning on/off an illumination. Accordingly, an error rate is considerably reduced, driver's stability is secured, and driver recognition performance is improved. Moreover, since the present invention does not require additional parts or components, a cost of materials can be prevented from rising.

Figure 4:
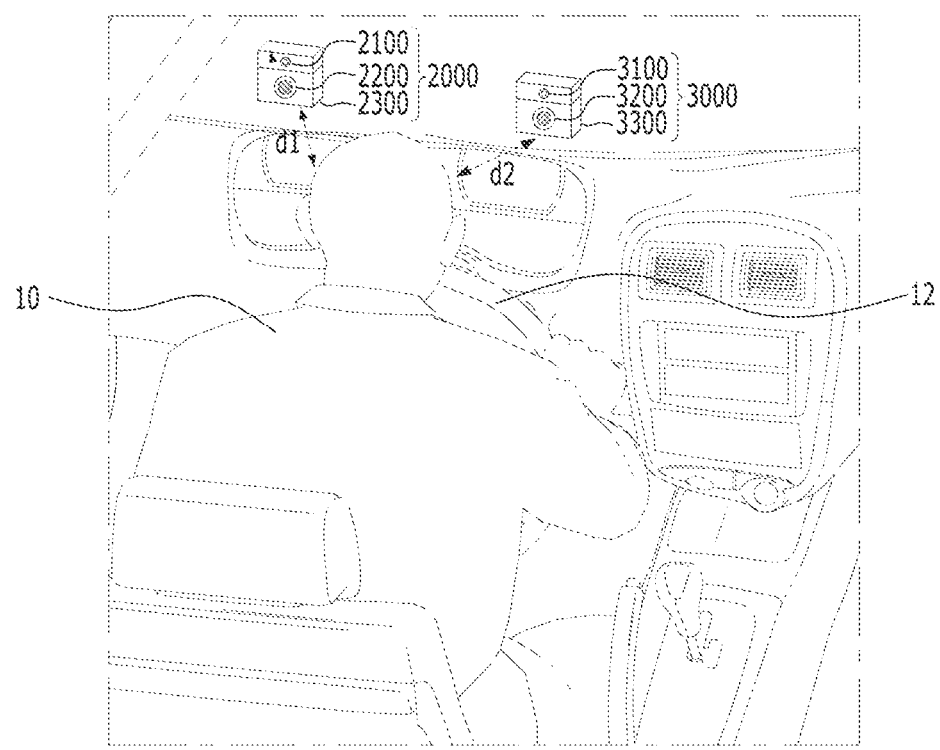
FIG. 4 and FIG. 5 are diagrams to describe disposed relations between an illumination unit and a camera unit.
Figure 5:
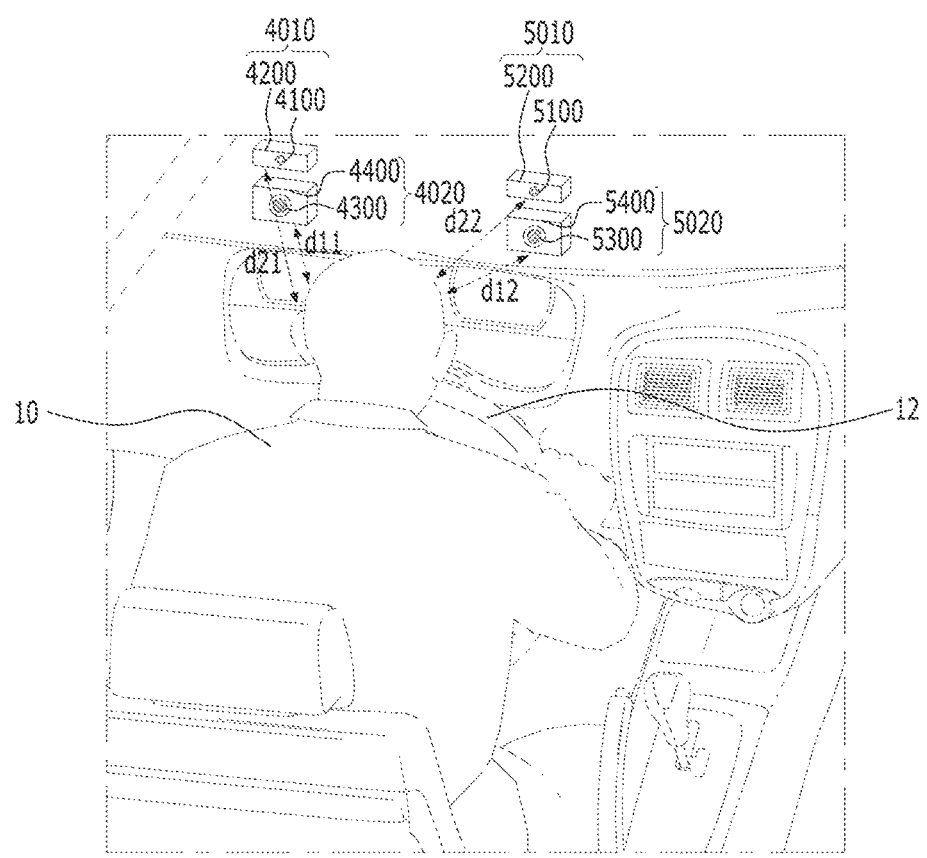

FIG. 4 and FIG. 5 are diagrams to describe disposed relations between an illumination unit and a camera unit. Referring to FIG. 4, a driver monitoring device of a digital device may include a first illumination unit 2100, a second illumination unit 3100, a first camera unit 2200 and a second camera unit 3200. In particular, the first camera unit 2200 and the first illumination unit 2100 configure one pair and can be disposed as a first module 2000. The second camera unit 3200 and the second illumination unit 3100 configure another pair and can be disposed as a second module 3000.

In more detail, the first module 2000 is configured in a manner that the first camera unit 2200 and the first illumination unit 2100 are disposed on a first substrate 2300, while the second module 3000 is configured in a manner that the second camera unit 3200 and the second illumination unit 3100 are disposed on a second substrate 3300. Further, if the driver monitoring device is disposed within a vehicle, the first module 2000 and the second module 3000 can be disposed symmetrically in front of a driver 10 centering on the driver 10 currently driving the vehicle by gripping a handle 12 of the vehicle. For instance, the first module 2000 and the second module 3000 can be disposed by being symmetric to each other with reference to a location of eyes of the driver 10. A distance d1 between the first module 2000 and the eyes of the driver 10 may be equal to a distance d2 between the second module 3000 and the eyes of the driver 10.

In some cases, an intensity of a first light generated from the first illumination unit 2100 of the first module 2000 may be different from an intensity of a second light generated from the second illumination unit 3100 of the second module 3000. In this instance, although the first module 2000 and the second module 3000 are symmetrically disposed with reference to the location of the eyes of the driver 10, a distance between the first illumination unit 2100 and the eyes of the driver 10 may be different from a distance between the second illumination unit 3100 and the eyes of the driver 10.

For instance, if the distance between the first illumination unit 2100 and the eyes of the driver 10 is greater than the distance between the second illumination unit 3100 and the eyes of the driver 10, the intensity of the first light generated from the first illumination unit 2100 may be greater than the intensity of the second light generated from the second illumination unit 3100.

Referring to FIG. 5, a illumination unit 4100 may be configured with a first module 4010, a first camera unit 4300 may be configured with a second module 4020, a second illumination unit 5200 may be configured with a third module 5010, and a second camera unit 5300 may be configured with a fourth module 5020. For instance, the first module 4010 is configured in a manner that the first illumination unit 4100 is disposed on a first substrate 4200, the second module 4020 is configured in a manner that the first camera unit 4300 is disposed on a second substrate 4400, the third module 5010 is configured in a manner that the second illumination unit 5100 is disposed on a third substrate 5200, and the fourth module 5020 is configured in a manner that the second camera unit 5300 is disposed on a fourth substrate 5400.

In this instance, the first module 4010 including the first illumination unit 4100 may be disposed by being adjacent to the second module 4020 including the first camera unit 4300, while the third module 5010 including the second illumination unit 5200 may be disposed by being adjacent to the fourth module 5020 including the second camera unit 5300. Further, if the driver monitoring device is disposed within a vehicle, the first module 4010, the second module 4020, the third module 5010 and the fourth module 5020 can be disposed symmetrically in front of a driver 10 centering on the driver 10 currently driving the vehicle by gripping a handle 12 of the vehicle.

For instance, the first module 4010 and the third module 5010 can be disposed by being symmetric to each other with reference to a location of eyes of the driver 10, and the second module 4020 and the fourth module 5020 can be disposed by being symmetric to each other. A distance d21 between the first module 4010 and the eyes of the driver 10 may be equal to a distance d22 between the third module 5010 and the eyes of the driver 10. A distance d11 between the second module 4020 and the eyes of the driver 10 may be equal to a distance d12 between the fourth module 5020 and the eyes of the driver 10.

In some cases, an intensity of a first light generated from the first illumination unit 4100 of the first module 4010 may be different from an intensity of a second light generated from the second illumination unit 5100 of the third module 5010. In this instance, although the first module 4010 and the third module 5010 are symmetrically disposed with reference to the location of the eyes of the driver 10, a distance between the first illumination unit 4100 and the eyes of the driver 10 may be different from a distance between the second illumination unit 5100 and the eyes of the driver 10.

For instance, if the distance between the first illumination unit 4100 and the eyes of the driver 10 is greater than the distance between the second illumination unit 5100 and the eyes of the driver 10, the intensity of the first light generated from the first illumination unit 4100 may be greater than the intensity of the second light generated from the second illumination unit 5100.

FIGS. 6 to 10 are diagrams to describe a driver monitoring process of a digital device according to an embodiment of the present invention. Referring to FIGS. 6 to 10, a digital device according to an embodiment of the present invention may include a first illumination unit 6010, a second illumination unit 6020, a first camera unit 7010 and a second camera unit 7020.

In particular, the first camera unit 7010 and the first illumination unit 6010 configure one pair and can be disposed as a first module. The second camera unit 7020 and the second illumination unit 6020 configure another pair and can be disposed as a second module. In more detail, the first module including the first camera unit 7010 and the first illumination unit 6010 and the second module including the second camera unit 7020 and the second illumination unit 6020 can be disposed symmetrically in front of a driver 8010 centering on the driver 10 currently driving the vehicle by gripping a handle 8030 of the vehicle.

Figure 6:
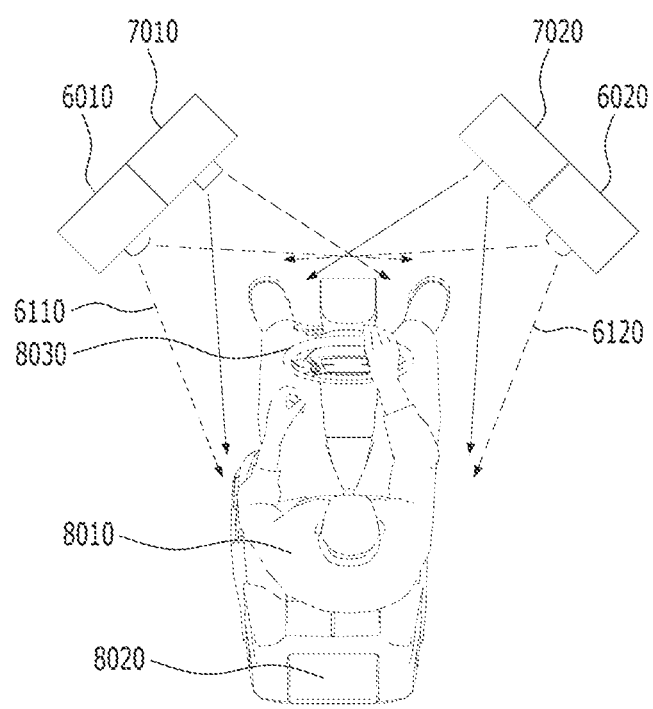
FIGS. 6 to 10 are diagrams to describe a driver monitoring process of a digital device according to an embodiment of the present invention.

If the above-configured driver monitoring device receives a driver monitoring request signal is received from the driver or the vehicle, referring to FIG. 6, the driver monitoring device turns on the first illumination unit 6010, the second illumination unit 6020, the first camera unit 7010 and the second camera unit 7020 and then obtains images of the driver 8010 from the first camera unit 7010 and the second camera unit 7020. In addition, the driver monitoring device checks whether a brightness of the image obtained from the first camera unit 7010 is equal to or greater than a reference value or whether the driver is detected from the image obtained from the second camera unit 7020.

Figure 7:
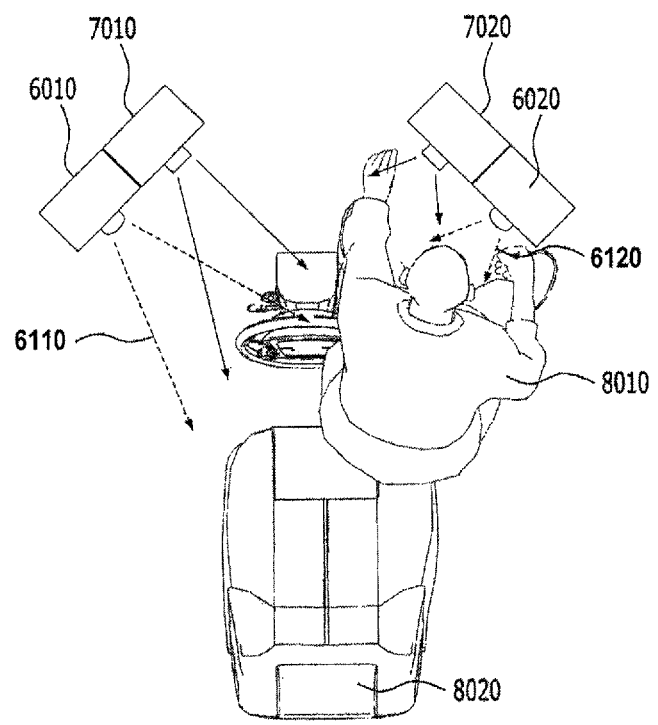

Referring to FIG. 7, if the driver 8010 moves from a driver seat 8020 to the second module including the second camera unit 7020 and the second illumination unit 6020, eyes of the driver 8010 may be damaged by an infrared light 6120 generated from the second illumination unit 6020. Hence, the driver monitoring device needs a process for checking whether an object nearby the second module including the second camera unit 7020 and the second illumination unit 6020 is actually a driver.

The driver monitoring device checks whether a brightness of the image obtained from the first camera unit 7010 is equal to or greater than a reference value or whether the driver is detected from the image obtained from the second camera unit 7020. If the driver 8010 moves to the second module, since the driver 8010 blocks the second illumination unit 6020, the brightness of the image obtained from the first camera unit 7010 may be smaller than the reference value. Moreover, if the driver 8010 moves to the second module, since the driver 8010 deviates from a photographing range of the second camera unit 7020, the driver 8010 may not be detected from the image obtained from the second camera unit 7020.

Hence, if the brightness of the image obtained from the first camera unit 7010 is not equal to or greater than the reference value or the driver is not detected from the image obtained from the second camera unit 7020, the driver monitoring device obtains a first comparative image from the first camera unit 7010 by turning off the second illumination unit 6020 and also obtains a second comparative image from the first camera unit 7010 by turning on the second illumination unit 6020.

Figure 8:
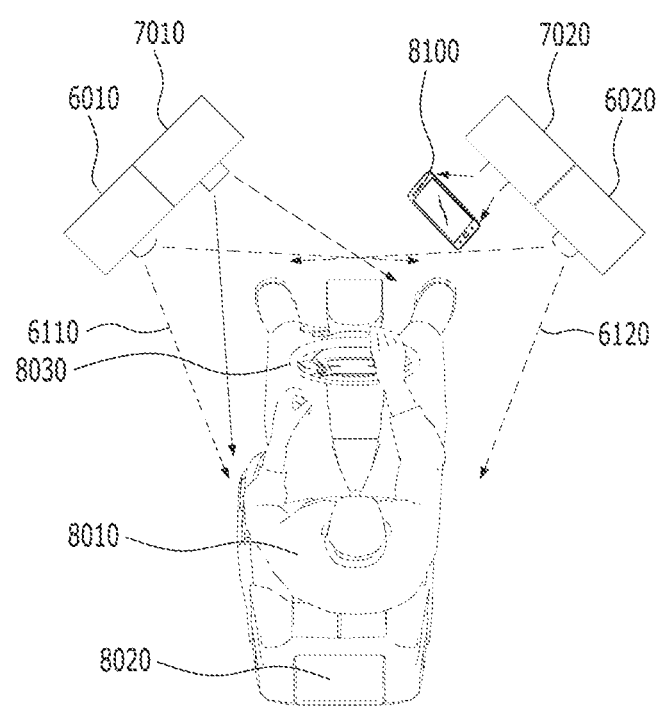

Referring to FIG. 8, if the driver 8010 does not move from the driver seat 8020 but a different prescribed object moves to the second module including the second camera unit 7020 and the second illumination unit 6020, since the driver monitoring device commits an error in recognizing that the driver 8010 approaches the second module, the driver monitoring device may turn off the second illumination unit 6020.

In this instance, since the driver monitoring device turns off the second illumination unit 6020 despite that the driver 8010 is normally driving the corresponding vehicle, the driver monitoring device is unable to continuously monitor a state of the driver 8010. In order to eliminate such an erroneous process, the driver monitoring device obtains a first comparative image from the first camera unit 7010 by turning off the second illumination unit 6020 and also obtains a second comparative image from the first camera unit 7010 by turning on the second illumination unit 6020.

In addition, the driver monitoring device checks whether a difference value between a brightness of the obtained first comparative image and a brightness of the obtained second comparative image is equal to or greater than a reference difference value. If the difference value between the brightness of the obtained first comparative image and the brightness of the obtained second comparative image is not equal to or greater than the reference difference value, the driver monitoring device turns off the second illumination unit 6020 to protect driver's eyes.

If the driver approaches the second module, the brightness of the first comparative image obtained from the first camera unit 7010 by turning off the second illumination unit 6020 may not have a big difference from the brightness of the second comparative image obtained from the first camera unit 7010 by turning on the second illumination unit 6020.

In this instance, since the brightness of the first comparative image is determined by the first illumination unit 6010 only and the brightness of the second comparative image is determined by the first illumination unit 6010 only as well, if the driver approaches the second module, there will be no big difference between the brightness of the first comparative image and the brightness of the second comparative image.

Yet, if a prescribed object approaches the second module instead of the driver, the brightness of the first comparative image obtained from the first camera unit 7010 by turning off the second illumination unit 6020 may have a big difference from the brightness of the second comparative image obtained from the first camera unit 7010 by turning on the second illumination unit 6020.

In this instance, since the brightness of the first comparative image is determined by the first illumination unit 6010 only and the brightness of the second comparative image is determined by the first illumination unit 6010 and the second illumination unit 6020, if the prescribed object other than the driver approaches the second module, there will be a big difference between the brightness of the first comparative image and the brightness of the second comparative image.

Figure 9:
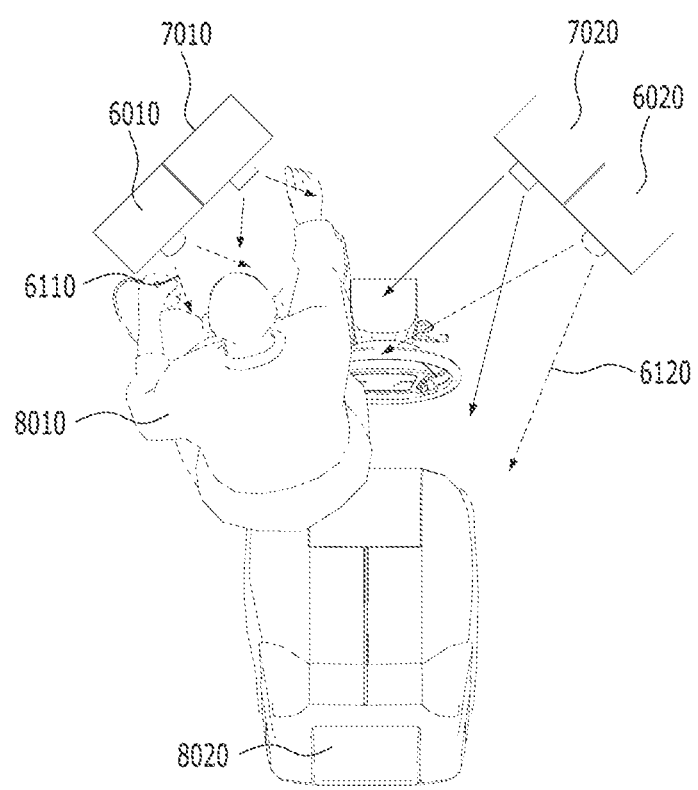

Meanwhile, referring to FIG. 9, if the driver 8010 moves from the driver seat 8020 to the first module including the first camera unit 7010 and the first illumination unit 6010, the eyes of the driver 8010 may be damaged by an infrared light 6110 generated from the first illumination unit 6010. Hence, the driver monitoring device needs a process for checking whether an object nearby the first module including the first camera unit 7010 and the first illumination unit 6010 is actually the driver.

The driver monitoring device checks whether a brightness of the image obtained from the second camera unit 7020 is equal to or greater than a reference value or whether the driver is detected from the image obtained from the first camera unit 7010. If the driver 8010 moves to the first module, since the driver 8010 blocks the first illumination unit 6010, the brightness of the image obtained from the second camera unit 7020 may be smaller than the reference value.

Moreover, if the driver 8010 moves to the first module, since the driver 8010 deviates from a photographing range of the first camera unit 7010, the driver 8010 may not be detected from the image obtained from the first camera unit 7010. Hence, if the brightness of the image obtained from the second camera unit 7020 is not equal to or greater than the reference value or the driver is not detected from the image obtained from the first camera unit 7010, the driver monitoring device obtains a third comparative image from the second camera unit 7020 by turning off the first illumination unit 6010 and also obtains a fourth comparative image from the second camera unit 7020 by turning on the first illumination unit 6010.

Figure 10:
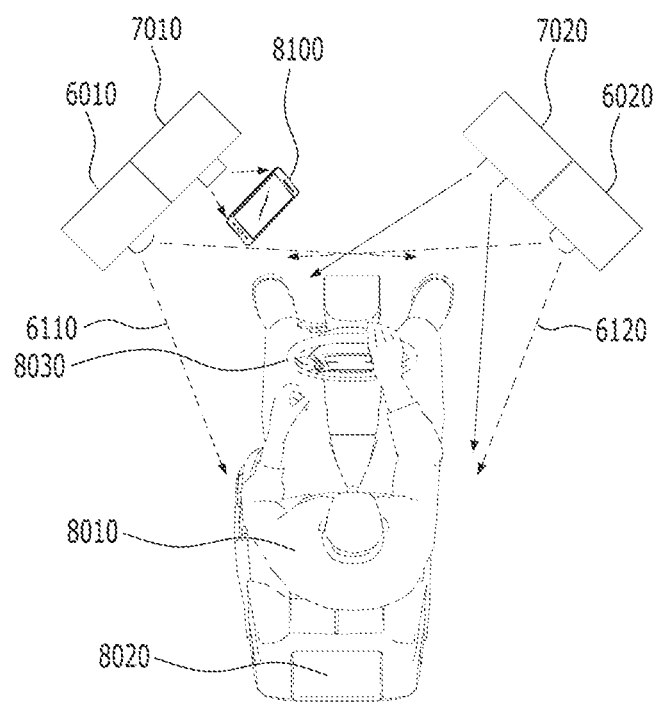

Referring to FIG. 10, if the driver 8010 does not move from the driver seat 8020 but a different prescribed object moves to the first module including the first camera unit 7010 and the first illumination unit 6010, since the driver monitoring device commits an error in recognizing that the driver 8010 approaches the first module, the driver monitoring device may turn off the first illumination unit 6010.

In this instance, since the driver monitoring device turns off the first illumination unit 6010 despite that the driver 8010 is normally driving the corresponding vehicle, the driver monitoring device is unable to continuously monitor a state of the driver 8010. In order to eliminate such an erroneous process, the driver monitoring device obtains a third comparative image from the second camera unit 7020 by turning off the first illumination unit 6010 and also obtains a fourth comparative image from the second camera unit 7020 by turning on the first illumination unit 6010.

In addition, the driver monitoring device checks whether a difference value between a brightness of the obtained third comparative image and a brightness of the obtained fourth comparative image is equal to or greater than a reference difference value. If the difference value between the brightness of the obtained third comparative image and the brightness of the obtained fourth comparative image is not equal to or greater than the reference difference value, the driver monitoring device turns off the first illumination unit 6010 to protect driver's eyes.

If the driver approaches the first module, the brightness of the third comparative image obtained from the second camera unit 7020 by turning off the first illumination unit 6010 may not have a big difference from the brightness of the fourth comparative image obtained from the second camera unit 7020 by turning on the first illumination unit 6010.

In this instance, since the brightness of the third comparative image is determined by the second illumination unit 6020 only and the brightness of the fourth comparative image is determined by the second illumination unit 6020 only as well, if the driver approaches the first module, there will be no big difference between the brightness of the third comparative image and the brightness of the fourth comparative image.

Yet, if a prescribed object other than the driver approaches the second module, the brightness of the third comparative image obtained from the second camera unit 7020 by turning off the first illumination unit 6010 may have a big difference from the brightness of the fourth comparative image obtained from the second camera unit 7020 by turning on the first illumination unit 6010.

In this instance, since the brightness of the third comparative image is determined by the second illumination unit 6020 only and the brightness of the fourth comparative image is determined by the first illumination unit 6010 and the second illumination unit 6020, if the prescribed object other than the driver approaches the first module, there will be a big difference between the brightness of the third comparative image and the brightness of the fourth comparative image.

Therefore, the present invention primarily analyzes the obtained images using the first illumination unit, the second illumination unit, the first camera unit and the second camera unit and then secondarily analyzes a comparative image obtained by turning on/off an illumination. Accordingly, an error rate is considerably reduced, driver's stability is secured, and driver recognition performance is improved.

Figure 11:
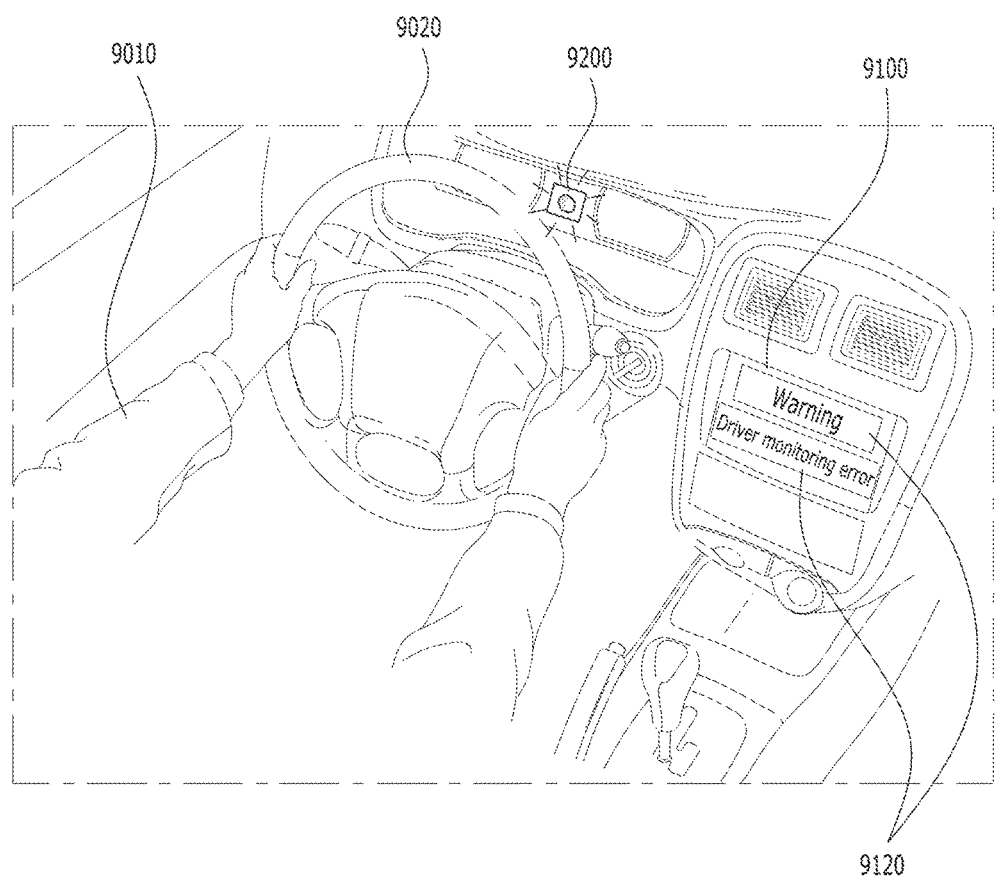
FIG. 11 is a diagram to illustrate a warning notification for an error of a driver monitoring device.

FIG. 11 is a diagram to illustrate a warning notification for an error of a driver monitoring device. Referring to FIG. 11, a driver monitoring device according to an embodiment of the present invention obtains images from a first camera unit and a second camera unit and then checks whether a brightness of the image obtained from the first camera is equal to or greater than a reference value or whether a driver is detected from the image obtained from the second camera unit.

In addition, if the brightness of the image obtained from the first camera is not equal to or greater than the reference value or if the driver is not detected from the image obtained from the second camera unit, the driver monitoring device obtains a first comparative image from the first camera unit by turning off a second illumination unit and also obtains a second comparative image form the first camera unit by turning on a second illumination unit.

In addition, the driver monitoring device checks whether a difference value between a brightness of the obtained first comparative image and a brightness of the obtained second comparative image is equal to or greater than a reference difference value. If the difference value between the brightness of the obtained first comparative image and the brightness of the obtained second comparative image is not equal to or greater than the reference difference value, the driver monitoring device turns off the second illumination unit.

In addition, the driver monitoring device checks whether both of the first illumination unit and the second illumination unit are turned off. If both of the first illumination unit and the second illumination unit are turned off, the driver monitoring device displays a warning to a driver 9010 and can turn on both of the first illumination unit and the second illumination unit.

Further, the driver monitoring device can perform the warning display by at least one of a first method of creating a warning message 9120 and then displaying the created warning message 9120 on a display unit 9100 and a second method of turning on/off a warning notification illumination 9200 continuously for a predetermined time.

In particular, the driver monitoring device may turn on both of the first illumination unit and the second illumination unit after the elapse of a predetermined time from a timing point of displaying the warning to the driver 9010. Thus, when both of the first illumination unit and the second illumination unit are turned off, if an abnormal error is discovered, the present invention displays a warning to a driver. Accordingly, an error rate is considerably reduced, driver's stability is secured, and driver recognition performance is improved. Moreover, the present invention can monitor a user's state by being installed on a general digital device or the like as well as can monitor a driver's state by being installed on a vehicle.

Figure 12:
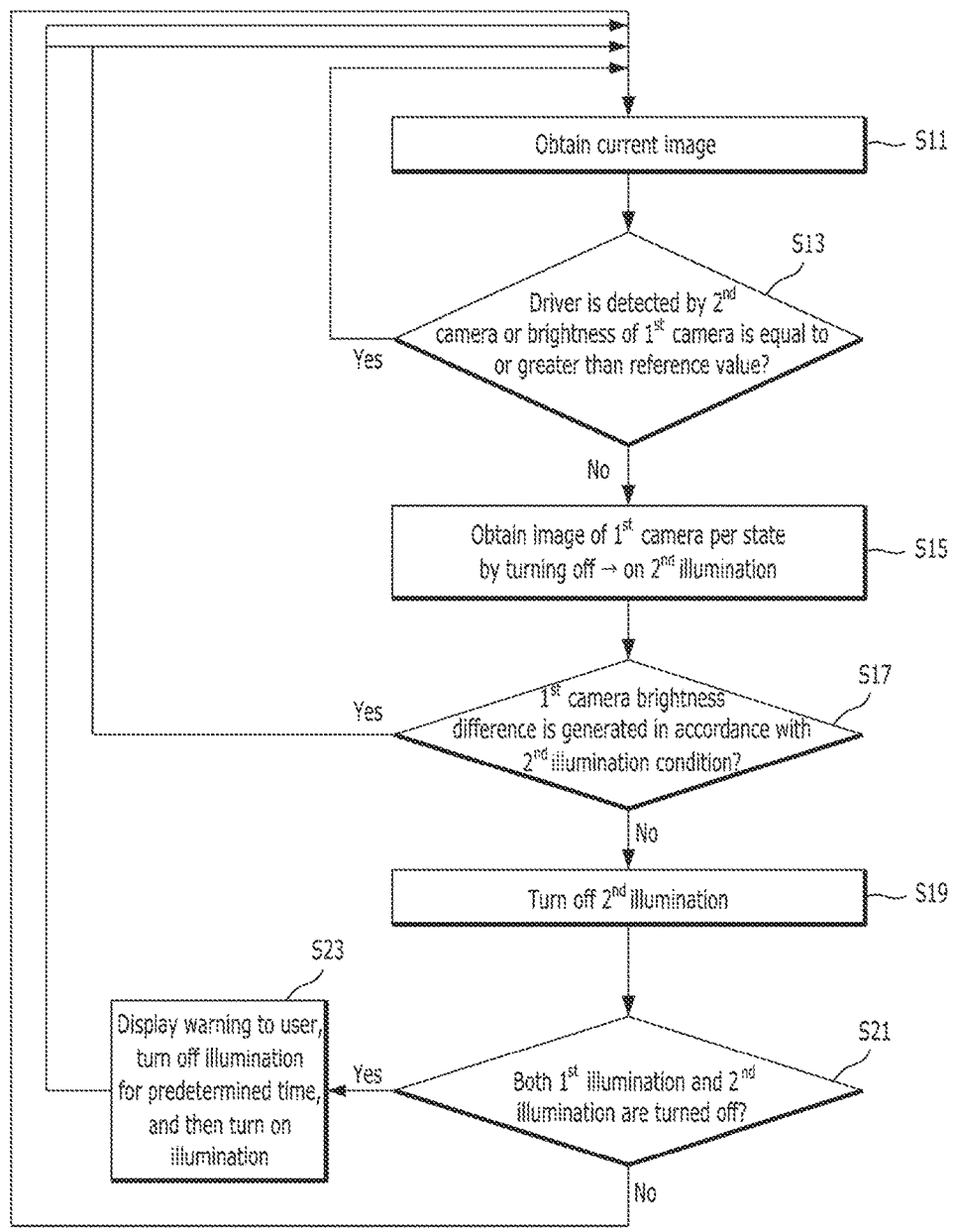
FIG. 12 is a flowchart to describe driver monitoring method of a digital device according to a first embodiment of the present invention.

FIG. 12 is a flowchart to describe driver monitoring method of a digital device according to a first embodiment of the present invention. Referring to FIG. 12, a control unit of a digital device obtains images from a first camera unit and a second camera unit (S11). Before obtaining the images from the first camera unit and the second camera unit, if a driver monitoring request signal is externally received, the control unit can turn on a first illumination unit, a second illumination unit, the first camera unit and the second camera unit.

In some cases, if the digital device is installed on a vehicle, the control unit can turn on the first illumination unit, the second illumination unit, the first camera unit and the second camera unit as soon as the vehicle starts. If the digital device is installed on a general digital device, the control unit can turn on the first illumination unit, the second illumination unit, the first camera unit and the second camera unit as soon as the digital device starts.

In addition, the control unit checks whether a brightness of the image obtained from the first camera is equal to or greater than a reference value or whether a driver is detected from the image obtained from the second camera unit (S13). In this instance, the reference value for the image brightness may be determined in advance and saved in a storage unit. Moreover, the reference value for the image brightness may be determined depending on an internal vehicle environment of the driver.

For instance, when the sun sets or the weather is cloudy, if the internal vehicle environment of the driver gets dark, an image brightness is detected by relatively lowering a reference value for the image brightness. In another instance, when the sun rises or the weather is sunny, if the internal vehicle environment of the driver gets bright, an image brightness is detected by relatively raising a reference value for the image brightness.

Hence, the reference value for the image brightness can be set to various values depending on an external environment of a place on which the monitoring device of the digital device is installed. In some cases, the driver or user may change the reference value for the image brightness saved in the storage unit in advance. Further, if the driver or user changes the reference value for the image brightness, the control unit of the digital device may additionally provide a change setting window through the display unit.

As a result of the check, if the brightness of the image obtained from the first camera unit is not equal to or greater than the reference value or the driver is not detected from the image obtained from the second camera unit, the control unit can obtain a first comparative image from the first camera unit by turning off the second illumination unit and can also obtain a second comparative image from the first camera unit by turning on the second illumination unit (S15).

In this instance, a timing point of turning off the second illumination unit and a timing point of turning on the second illumination unit may have a predetermined time interval. In addition, the predetermined time interval may include a time for obtaining the first comparative image from the first camera unit. In particular, if the brightness of the image obtained from the first camera unit is not equal to or greater than the reference value or the driver is not detected from the image obtained from the second camera unit, the control unit primarily determines that the driver has approached the second illumination unit closely.

Further, as a result of the check, if the brightness of the image obtained from the first camera unit is equal to or greater than the reference value or the driver is detected from the image obtained from the second camera unit, the control unit can continuously perform the step S11 of obtaining the images from the first camera unit and the second camera unit. In addition, the control unit checks whether a difference value between a brightness of the first comparative image obtained from the first camera unit and a brightness of the second comparative image is equal to or greater than a reference difference value (S17).

In this instance, the reference difference value may be determined in advance and saved in a storage unit. Moreover, the reference difference value for the brightness of the first comparative image and the brightness of the second comparative image may be determined depending on an internal vehicle environment of the driver.

For instance, when the sun sets or the weather is cloudy, if the internal vehicle environment of the driver gets dark, an image brightness is detected by relatively lowering a reference difference value for the comparative image brightness. In another instance, when the sun rises or the weather is sunny, if the internal vehicle environment of the driver gets bright, an image brightness is detected by relatively raising a reference difference value for the comparative image brightness.

Hence, the reference difference value for the comparative image brightness can be set to various values depending on an external environment of a place on which the monitoring device of the digital device is installed. In some cases, the driver or user may change the reference difference value for the comparative image brightness saved in the storage unit in advance.

Further, if the driver or user changes the reference difference value for the comparative image brightness, the control unit of the digital device may additionally provide a change setting window through the display unit. In addition, as a result of the check, if a difference value between the brightness of the obtained first comparative image and the brightness of the obtained second comparative image is not equal to or greater than the reference difference value, the control unit can turn off the second illumination unit (S19).

In particular, if there is almost no difference between the brightness of the first comparative image and the brightness of the second comparative image, the control unit determines that the driver has approached the second illumination unit closely and can then turn off the second illumination unit. Further, as a result of the check, if a difference value between the brightness of the obtained first comparative image and the brightness of the obtained second comparative image is equal to or greater than the reference difference value, the control unit can continuously perform the step S11 of obtaining the images from the first camera unit and the second camera unit.

In particular, if there is a big difference between the brightness of the first comparative image and the brightness of the second comparative image, the control unit determines that the driver has not approached the second illumination unit closely and does not turn off the second illumination unit. In some cases, after the control unit has turned off the second illumination unit, the control unit checks whether both of the first illumination unit and the second illumination unit are turned off (S21).

In addition, as a result of the check, if both of the first illumination unit and the second illumination unit are turned off, the control unit displays a warning to the driver, turns on both of the first illumination unit and the second illumination unit, and can then continuously perform the step S11 of obtaining the images from the first camera unit and the second camera unit (S23).

In particular, if both of the first illumination unit and then second illumination unit are turned off, the control unit determines that there is an error in the driver monitoring device, displays the warning to the driver, and can then reset the driver monitoring device by turning on both of the first illumination unit and the second illumination unit.

Further, the control unit can display the warning to the user by at least one of a first method of creating a warning message and then displaying the created warning message on a display unit and a second method of turning on/off a warning notification illumination continuously for a predetermined time. Moreover, the control unit can turn on both of the first illumination unit and the second illumination unit after the elapse of a predetermined time from a timing point of displaying the warning to the driver.

In particular, the reason for the first illumination unit and the second illumination unit to be turned on after the elapse of the predetermined time from the timing point of displaying the warning to the driver is to give a reset time for restarting a driver monitoring algorithm from the beginning. Yet, if both of the first illumination unit and the second illumination unit are not turned off, the control unit can continuously perform the step S11 of obtaining the images from the first camera unit and the second camera unit.

Thus, if the brightness of the image obtained from the first camera unit is not equal to or greater than the reference value or the driver is not detected from the image obtained from the second camera unit, the present invention primarily determines that the driver may have approached the second illumination unit closely.

In addition, if there is almost no difference between the brightness of the first comparative image and the brightness of the second comparative image, the present invention secondarily determines that the driver has approached the second illumination unit closely. Accordingly, an error rate is considerably reduced, driver's stability is secured, and driver recognition performance is improved.

Moreover, if both of the first illumination unit and the second illumination unit are turned off, the present invention determines that there is an error in the driver monitoring device, displays the warning to the driver, and resets the driver monitoring device by turning on both of the first illumination unit and the second illumination unit. Accordingly, an error rate of the driver monitoring device can be considerably reduced and reliability of the driver monitoring device can be enhanced.

Figure 13:
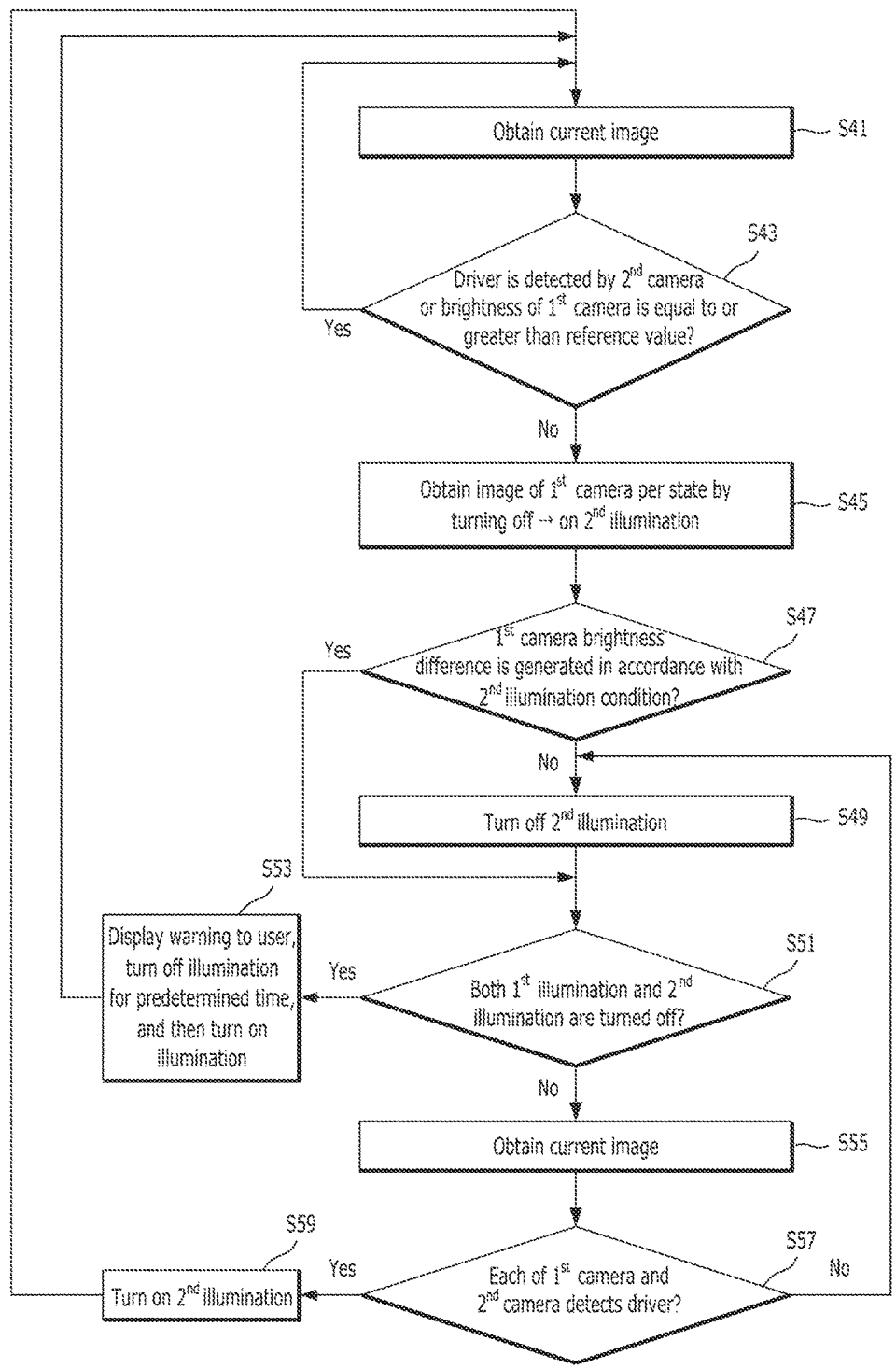
FIG. 13 is a flowchart to describe driver monitoring method of a digital device according to a second embodiment of the present invention.

FIG. 13 is a flowchart to describe driver monitoring method of a digital device according to a second embodiment of the present invention. Referring to FIG. 13, since the steps S41, S43 and S45 of the second embodiment of the present invention are identical to the steps S11, S13 and S15 of the first embodiment of the present invention, their details shall be omitted for clarity of the description.

The control unit of the digital device checks whether a difference value between a brightness of the first comparative image obtained from the first camera unit and a brightness of the second comparative image is equal to or greater than a reference difference value (S47). In addition, as a result of the check, if a difference value between the brightness of the obtained first comparative image and the brightness of the obtained second comparative image is not equal to or greater than the reference difference value, the control unit can turn off the second illumination unit (S49).

In particular, if there is almost no difference between the brightness of the first comparative image and the brightness of the second comparative image, the control unit determines that the driver has approached the second illumination unit closely and can then turn off the second illumination unit. Further, as a result of the check, if a difference value between the brightness of the obtained first comparative image and the brightness of the obtained second comparative image is equal to or greater than the reference difference value, the control unit checks whether both of the first illumination unit and the second illumination unit are turned off (S51).

In addition, as a result of the check, if both of the first illumination unit and the second illumination unit are turned off, the control unit displays a warning to the driver, turns on both of the first illumination unit and the second illumination unit, and can then continuously perform the step S41 of obtaining the images from the first camera unit and the second camera unit (S53).

In particular, if the difference value between the brightness of the obtained first comparative image and the brightness of the obtained second comparative image is equal to or greater than the reference difference value, the control unit can check a presence or non-presence of error of the driver monitoring device by checking whether both of the first illumination unit and the second illumination unit are turned off. Meanwhile, after the control unit has turned off the second illumination unit, the control unit checks whether both of the illumination unit and the second illumination unit are turned off (S51).

In addition, as a result of the check, if both of the first illumination unit and then second illumination unit are turned off, the control unit displays the warning to the driver, turns on both of the first illumination unit and the second illumination unit, and can then continuously perform the step S41 of obtaining the images from the first camera unit and the second camera unit (S53). In particular, if both of the first illumination unit and the second illumination unit are turned off, the control unit determines that there is an error in the driver monitoring device, displays the warning to the driver, and can then reset the driver monitoring device by turning on both of the first illumination unit and the second illumination unit.

Further, the control unit can display the warning to the user by at least one of a first method of creating a warning message and then displaying the created warning message on a display unit and a second method of turning on/off a warning notification illumination continuously for a predetermined time. Moreover, the control unit can turn on both of the first illumination unit and the second illumination unit after the elapse of a predetermined time from a timing point of displaying the warning to the driver.

In particular, the reason for the first illumination unit and the second illumination unit to be turned on after the elapse of the predetermined time from the timing point of displaying the warning to the driver is to give a reset time for restarting a driver monitoring algorithm from the beginning. Yet, if both of the first illumination unit and the second illumination unit are not turned off, the control unit can obtain images from the first camera unit and the second camera unit (S55).

In addition, the control unit checks whether the driver is detected from all the images obtained from the first camera unit and the second camera unit (S57). In addition, as a result of the check, if the driver is detected from all the images obtained from the first camera unit and the second camera unit, the control unit turns on the second illumination unit and can then continuously perform the step S41 of obtaining the images from the first camera unit and the second camera unit (S59). Yet, if the driver is not detected from all the images obtained from the first camera unit and the second camera unit, the control unit can repeatedly perform the step S49 of turning off the second illumination unit and the rest of the steps following the step S49.

Thus, according to the second embodiment of the present invention, if the difference value between the brightness of the obtained first comparative image and the brightness of the obtained second comparative image is equal to or greater than the reference difference value, it can check a presence or non-presence of error of the driver monitoring device by checking whether both of the first illumination unit and the second illumination unit are turned off.

Moreover, according to the second embodiment of the present invention, if the driver is detected from all the images obtained from the first camera unit and the second camera unit, the second illumination unit is turned on. Further, if the driver is not detected from all the images obtained from the first camera unit and the second camera unit, the second illumination unit is turned off. Accordingly, an error rate of the driver monitoring device can be reduced.

Figure 14:
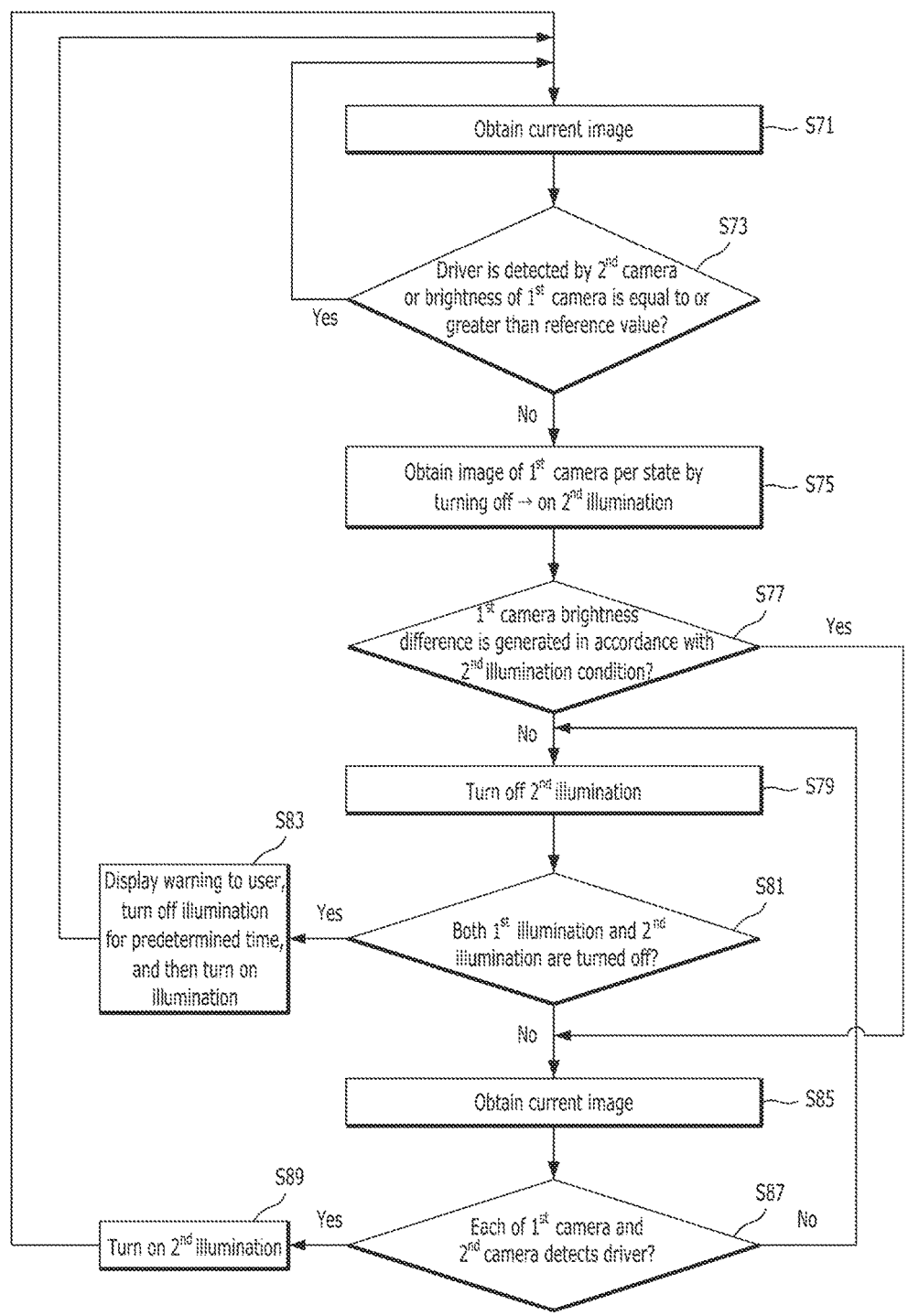
FIG. 14 is a flowchart to describe driver monitoring method of a digital device according to a third embodiment of the present invention.

FIG. 14 is a flowchart to describe driver monitoring method of a digital device according to a third embodiment of the present invention. Referring to FIG. 14, since the steps S71, S73 and S75 of the third embodiment of the present invention are identical to the steps S11, S13 and S15 of the first embodiment of the present invention, their details shall be omitted for clarity of the description.

The control unit of the digital device checks whether a difference value between a brightness of the first comparative image obtained from the first camera unit and a brightness of the second comparative image is equal to or greater than a reference difference value (S77). In addition, as a result of the check, if a difference value between the brightness of the obtained first comparative image and the brightness of the obtained second comparative image is not equal to or greater than the reference difference value, the control unit can turn off the second illumination unit (S79).

In particular, if there is almost no difference between the brightness of the first comparative image and the brightness of the second comparative image, the control unit determines that the driver has approached the second illumination unit closely and can then turn off the second illumination unit. Further, as a result of the check, if a difference value between the brightness of the obtained first comparative image and the brightness of the obtained second comparative image is equal to or greater than the reference difference value, the control unit obtains images from the first camera unit and the second camera unit (S85) and then checks whether the driver is detected from all the images obtained from the first camera unit and the second camera unit (S87).

Meanwhile, after the control unit has turned off the second illumination unit, the control unit checks whether both of the first illumination unit and the second illumination unit are turned off (S81). In addition, as a result of the check, if both of the first illumination unit and the second illumination unit are turned off, the control unit displays a warning to the driver, turns on both of the first illumination unit and the second illumination unit, and can then continuously perform the step S71 of obtaining the images from the first camera unit and the second camera unit (S83).

In particular, if both of the first illumination unit and the second illumination unit are turned off, the control unit determines that there is an error in the driver monitoring device, displays the warning to the driver, and can then reset the driver monitoring device by turning on both of the first illumination unit and the second illumination unit. Further, the control unit can display the warning to the user by at least one of a first method of creating a warning message and then displaying the created warning message on a display unit and a second method of turning on/off a warning notification illumination continuously for a predetermined time.

Moreover, the control unit can turn on both of the first illumination unit and the second illumination unit after the elapse of a predetermined time from a timing point of displaying the warning to the driver. In particular, the reason for the first illumination unit and the second illumination unit to be turned on after the elapse of the predetermined time from the timing point of displaying the warning to the driver is to give a reset time for restarting a driver monitoring algorithm from the beginning.

Yet, if both of the first illumination unit and the second illumination unit are not turned off, the control unit can obtain images from the first camera unit and the second camera unit (S85). In addition, the control unit checks whether the driver is detected from all the images obtained from the first camera unit and the second camera unit (S87). In addition, as a result of the check, if the driver is detected from all the images obtained from the first camera unit and the second camera unit, the control unit turns on the second illumination unit and can then continuously perform the step S71 of obtaining the images from the first camera unit and the second camera unit (S89).

Yet, as a result of the check, if the driver is not detected from all the images obtained from the first camera unit and the second camera unit, the control unit can repeatedly perform the step S79 of turning off the second illumination unit and the rest of the steps following the step S79. Thus, according to the third embodiment of the present invention, when the difference value between the brightness of the obtained first comparative image and the brightness of the obtained second comparative image is equal to or greater than the reference difference value, if the driver is detected from all the images obtained from the first camera unit and the second camera unit, the second illumination unit is turned on. Further, if the driver is not detected from all the images obtained from the first camera unit and the second camera unit, the second illumination unit is turned off. Accordingly, an error rate of the driver monitoring device can be reduced.

Moreover, according to the third embodiment of the present invention, by checking whether both of the first illumination unit and the second illumination unit are turned off, it can check a presence or non-presence of error in the driver monitoring device.

Figure 15:
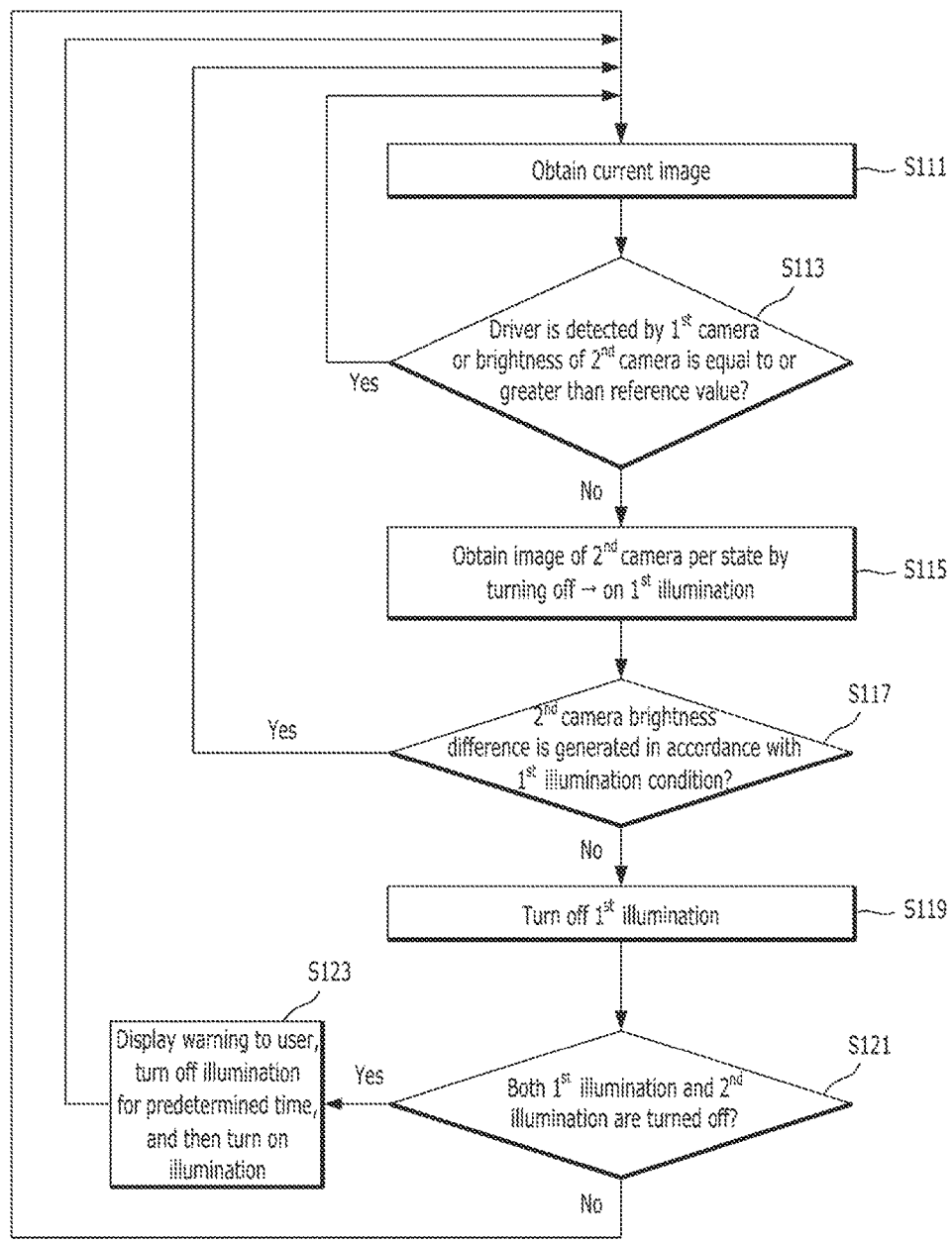
FIG. 15 is a flowchart to describe driver monitoring method of a digital device according to a fourth embodiment of the present invention.

FIG. 15 is a flowchart to describe driver monitoring method of a digital device according to a fourth embodiment of the present invention. Referring to FIG. 15, a control unit of a digital device obtains images from a first camera unit and a second camera unit (S111). Before obtaining the images from the first camera unit and the second camera unit, if a driver monitoring request signal is externally received, the control unit can turn on a first illumination unit, a second illumination unit, the first camera unit and the second camera unit.

In some cases, if the digital device is installed on a vehicle, the control unit can turn on the first illumination unit, the second illumination unit, the first camera unit and the second camera unit as soon as the vehicle starts. If the digital device is installed on a general digital device, the control unit can turn on the first illumination unit, the second illumination unit, the first camera unit and the second camera unit as soon as the digital device starts.

In addition, the control unit checks whether a brightness of the image obtained from the second camera is equal to or greater than a reference value or whether a driver is detected from the image obtained from the first camera unit (S113). In this instance, the reference value for the image brightness may be determined in advance and saved in a storage unit. Moreover, the reference value for the image brightness may be determined depending on an internal vehicle environment of the driver.

For instance, when the sun sets or the weather is cloudy, if the internal vehicle environment of the driver gets dark, an image brightness is detected by relatively lowering a reference value for the image brightness. In another instance, when the sun rises or the weather is sunny, if the internal vehicle environment of the driver gets bright, an image brightness is detected by relatively raising a reference value for the image brightness. Hence, the reference value for the image brightness can be set to various values depending on an external environment of a place on which the monitoring device of the digital device is installed.

In some cases, the driver or user may change the reference value for the image brightness saved in the storage unit in advance. Further, if the driver or user changes the reference value for the image brightness, the control unit of the digital device may additionally provide a change setting window through the display unit.

As a result of the check, if the brightness of the image obtained from the second camera unit is not equal to or greater than the reference value or the driver is not detected from the image obtained from the first camera unit, the control unit can obtain a third comparative image from the second camera unit by turning off the first illumination unit and can also obtain a fourth comparative image from the second camera unit by turning on the first illumination unit (S115).

In this instance, a timing point of turning off the first illumination unit and a timing point of turning on the first illumination unit may have a predetermined time interval. Further, the predetermined time interval may include a time for obtaining the second comparative image from the second camera unit.

In particular, if the brightness of the image obtained from the second camera unit is not equal to or greater than the reference value or the driver is not detected from the image obtained from the first camera unit, the control unit primarily determines that the driver has approached the first illumination unit closely.

Further, as a result of the check, if the brightness of the image obtained from the second camera unit is equal to or greater than the reference value or the driver is detected from the image obtained from the first camera unit, the control unit can continuously perform the step S111 of obtaining the images from the first camera unit and the second camera unit.

In addition, the control unit checks whether a difference value between a brightness of the third comparative image obtained from the second camera unit and a brightness of the fourth comparative image is equal to or greater than a reference difference value (S117). In this instance, the reference difference value may be set in advance and saved in a storage unit. Moreover, the reference difference value for the brightness of the third comparative image and the brightness of the fourth comparative image may be determined depending on an internal vehicle environment of the driver.

For instance, when the sun sets or the weather is cloudy, if the internal vehicle environment of the driver gets dark, an image brightness is detected by relatively lowering a reference difference value for the comparative image brightness. In another instance, when the sun rises or the weather is sunny, if the internal vehicle environment of the driver gets bright, an image brightness is detected by relatively raising a reference difference value for the comparative image brightness.

Hence, the reference difference value for the comparative image brightness can be set to various values depending on an external environment of a place on which the monitoring device of the digital device is installed. In some cases, the driver or user may change the reference difference value for the comparative image brightness saved in the storage unit in advance.

Further, if the driver or user changes the reference difference value for the comparative image brightness, the control unit of the digital device may additionally provide a change setting window through the display unit. In addition, as a result of the check, if a difference value between the brightness of the obtained third comparative image and the brightness of the obtained fourth comparative image is not equal to or greater than the reference difference value, the control unit can turn off the first illumination unit (S119).

In particular, if there is almost no difference between the brightness of the third comparative image and the brightness of the fourth comparative image, the control unit determines that the driver has approached the first illumination unit closely and can then turn off the first illumination unit. Further, as a result of the check, if a difference value between the brightness of the obtained third comparative image and the brightness of the obtained fourth comparative image is equal to or greater than the reference difference value, the control unit can continuously perform the step S111 of obtaining the images from the first camera unit and the second camera unit.

In particular, if there is a big difference between the brightness of the third comparative image and the brightness of the fourth comparative image, the control unit determines that the driver has not approached the first illumination unit closely and does not turn off the first illumination unit. In some cases, after the control unit has turned off the first illumination unit, the control unit checks whether both of the first illumination unit and the second illumination unit are turned off (S121).

In addition, as a result of the check, if both of the first illumination unit and the second illumination unit are turned off, the control unit displays a warning to the driver, turns on both of the first illumination unit and the second illumination unit, and can then continuously perform the step S111 of obtaining the images from the first camera unit and the second camera unit (S123).

In particular, if both of the first illumination unit and then second illumination unit are turned off, the control unit determines that there is an error in the driver monitoring device, displays the warning to the driver, and can then reset the driver monitoring device by turning on both of the first illumination unit and the second illumination unit.

Further, the control unit can display the warning to the user by at least one of a first method of creating a warning message and then displaying the created warning message on a display unit and a second method of turning on/off a warning notification illumination continuously for a predetermined time. Moreover, the control unit can turn on both of the first illumination unit and the second illumination unit after the elapse of a predetermined time from a timing point of displaying the warning to the driver.

In particular, the reason for the first illumination unit and the second illumination unit to be turned on after the elapse of the predetermined time from the timing point of displaying the warning to the driver is to give a reset time for restarting a driver monitoring algorithm from the beginning. Yet, if both of the first illumination unit and the second illumination unit are not turned off, the control unit can continuously perform the step S111 of obtaining the images from the first camera unit and the second camera unit.

Thus, if the brightness of the image obtained from the second camera unit is not equal to or greater than the reference value or the driver is not detected from the image obtained from the first camera unit, the present invention primarily determines that the driver may have approached the first illumination unit closely.

In addition, if there is almost no difference between the brightness of the third comparative image and the brightness of the fourth comparative image, the present invention secondarily determines that the driver has approached the first illumination unit closely. Accordingly, an error rate is considerably reduced, driver's stability is secured, and driver recognition performance is improved.

Moreover, if both of the first illumination unit and the second illumination unit are turned off, the present invention determines that there is an error in the driver monitoring device, displays the warning to the driver, and resets the driver monitoring device by turning on both of the first illumination unit and the second illumination unit. Accordingly, an error rate of the driver monitoring device can be considerably reduced and reliability of the driver monitoring device can be enhanced.

FIG. 16 is a flowchart to describe driver monitoring method of a digital device according to a fifth embodiment of the present invention. Referring to FIG. 16, since the steps S141, S143 and S145 of the sixth embodiment of the present invention are identical to the steps S111, S113 and S115 of the fourth embodiment of the present invention, their details shall be omitted for clarity of the description.

The control unit of the digital device checks whether a difference value between a brightness of the third comparative image obtained from the second camera unit and a brightness of the fourth comparative image is equal to or greater than a reference difference value (S147). In addition, as a result of the check, if a difference value between the brightness of the obtained third comparative image and the brightness of the obtained fourth comparative image is not equal to or greater than the reference difference value, the control unit can turn off the first illumination unit (S149).

In particular, if there is almost no difference between the brightness of the third comparative image and the brightness of the fourth comparative image, the control unit determines that the driver has approached the first illumination unit closely and can then turn off the first illumination unit. Further, as a result of the check, if a difference value between the brightness of the obtained third comparative image and the brightness of the obtained fourth comparative image is equal to or greater than the reference difference value, the control unit checks whether both of the first illumination unit and the second illumination unit are turned off (S151).

In addition, as a result of the check, if both of the first illumination unit and the second illumination unit are turned off, the control unit displays a warning to the driver, turns on both of the first illumination unit and the second illumination unit, and can then continuously perform the step S141 of obtaining the images from the first camera unit and the second camera unit (S153).

In particular, if the difference value between the brightness of the obtained third comparative image and the brightness of the obtained fourth comparative image is equal to or greater than the reference difference value, the control unit can check a presence or non-presence of error of the driver monitoring device by checking whether both of the first illumination unit and the second illumination unit are turned off.

Meanwhile, after the control unit has turned off the first illumination unit, the control unit checks whether both of the illumination unit and the second illumination unit are turned off (S151). In addition, as a result of the check, if both of the first illumination unit and then second illumination unit are turned off, the control unit displays the warning to the driver, turns on both of the first illumination unit and the second illumination unit, and can then continuously perform the step S141 of obtaining the images from the first camera unit and the second camera unit (S153).

In particular, if both of the first illumination unit and the second illumination unit are turned off, the control unit determines that there is an error in the driver monitoring device, displays the warning to the driver, and can then reset the driver monitoring device by turning on both of the first illumination unit and the second illumination unit. Further, the control unit can display the warning to the user by at least one of a first method of creating a warning message and then displaying the created warning message on a display unit and a second method of turning on/off a warning notification illumination continuously for a predetermined time.

Moreover, the control unit can turn on both of the first illumination unit and the second illumination unit after the elapse of a predetermined time from a timing point of displaying the warning to the driver. In particular, the reason for the first illumination unit and the second illumination unit to be turned on after the elapse of the predetermined time from the timing point of displaying the warning to the driver is to give a reset time for restarting a driver monitoring algorithm from the beginning.

Yet, as a result of the check, if both of the first illumination unit and the second illumination unit are not turned off, the control unit can obtain images from the first camera unit and the second camera unit (S155). In addition, the control unit checks whether the driver is detected from all the images obtained from the first camera unit and the second camera unit (S157).

In addition, as a result of the check, if the driver is detected from all the images obtained from the first camera unit and the second camera unit, the control unit turns on the first illumination unit and can then continuously perform the step S141 of obtaining the images from the first camera unit and the second camera unit (S159). Yet, as a result of the check, if the driver is not detected from all the images obtained from the first camera unit and the second camera unit, the control unit can repeatedly perform the step S149 of turning off the first illumination unit and the rest of the steps following the step S149.

Thus, according to the fifth embodiment of the present invention, if the difference value between the brightness of the obtained third comparative image and the brightness of the obtained fourth comparative image is equal to or greater than the reference difference value, it can check a presence or non-presence of error of the driver monitoring device by checking whether both of the first illumination unit and the second illumination unit are turned off.

Moreover, according to the fifth embodiment of the present invention, if the driver is detected from all the images obtained from the first camera unit and the second camera unit, the first illumination unit is turned on. Further, if the driver is not detected from all the images obtained from the first camera unit and the second camera unit, the second illumination unit is turned off. Accordingly, an error rate of the driver monitoring device can be reduced.

FIG. 17 is a flowchart to describe driver monitoring method of a digital device according to a sixth embodiment of the present invention. Referring to FIG. 17, since the steps S171, S173 and S175 of the sixth embodiment of the present invention are identical to the steps S111, S113 and S115 of the fourth embodiment of the present invention, their details shall be omitted for clarity of the description.

The control unit of the digital device checks whether a difference value between a brightness of the third comparative image obtained from the second camera unit and a brightness of the fourth comparative image is equal to or greater than a reference difference value (S177). In addition, as a result of the check, if a difference value between the brightness of the obtained third comparative image and the brightness of the obtained fourth comparative image is not equal to or greater than the reference difference value, the control unit can turn off the first illumination unit (S179).

In particular, if there is almost no difference between the brightness of the third comparative image and the brightness of the fourth comparative image, the control unit determines that the driver has approached the first illumination unit closely and can then turn off the first illumination unit.

Further, as a result of the check, if a difference value between the brightness of the obtained third comparative image and the brightness of the obtained fourth comparative image is equal to or greater than the reference difference value, the control unit obtains images from the first camera unit and the second camera unit (S185) and then checks whether the driver is detected from all the images obtained from the first camera unit and the second camera unit (S187).

Meanwhile, after the control unit has turned off the first illumination unit, the control unit checks whether both of the first illumination unit and the second illumination unit are turned off (S181). In addition, as a result of the check, if both of the first illumination unit and the second illumination unit are turned off, the control unit displays a warning to the driver, turns on both of the first illumination unit and the second illumination unit, and can then continuously perform the step S171 of obtaining the images from the first camera unit and the second camera unit (S183).

In particular, if both of the first illumination unit and the second illumination unit are turned off, the control unit determines that there is an error in the driver monitoring device, displays the warning to the driver, and can then reset the driver monitoring device by turning on both of the first illumination unit and the second illumination unit.

Further, the control unit can display the warning to the user by at least one of a first method of creating a warning message and then displaying the created warning message on a display unit and a second method of turning on/off a warning notification illumination continuously for a predetermined time. Moreover, the control unit can turn on both of the first illumination unit and the second illumination unit after the elapse of a predetermined time from a timing point of displaying the warning to the driver.

In particular, the reason for the first illumination unit and the second illumination unit to be turned on after the elapse of the predetermined time from the timing point of displaying the warning to the driver is to give a reset time for restarting a driver monitoring algorithm from the beginning. Yet, as a result of the check, if both of the first illumination unit and the second illumination unit are not turned off, the control unit can obtain images from the first camera unit and the second camera unit (S185).

In addition, the control unit checks whether the driver is detected from all the images obtained from the first camera unit and the second camera unit (S187). In addition, as a result of the check, if the driver is detected from all the images obtained from the first camera unit and the second camera unit, the control unit turns on the first illumination unit and can then continuously perform the step S171 of obtaining the images from the first camera unit and the second camera unit (S189).

Yet, as a result of the check, if the driver is not detected from all the images obtained from the first camera unit and the second camera unit, the control unit can repeatedly perform the step S179 of turning off the first illumination unit and the rest of the steps following the step S179.

Thus, according to the sixth embodiment of the present invention, when the difference value between the brightness of the obtained third comparative image and the brightness of the obtained fourth comparative image is equal to or greater than the reference difference value, if the driver is detected from all the images obtained from the first camera unit and the second camera unit, the first illumination unit is turned on. Further, if the driver is not detected from all the images obtained from the first camera unit and the second camera unit, the first illumination unit is turned off. Accordingly, an error rate of the driver monitoring device can be reduced.

Moreover, according to the sixth embodiment of the present invention, by checking whether both of the first illumination unit and the second illumination unit are turned off, it can check a presence or non-presence of error in the driver monitoring device.

Accordingly, embodiments of the present invention provide various effects and/or features. First of all, the present invention primarily analyzes the obtained images using the first illumination unit, the second illumination unit, the first camera unit and the second camera unit and then secondarily analyzes a comparative image obtained by turning on/off an illumination. Accordingly, an error rate is considerably reduced, driver's stability is secured, and driver recognition performance is improved. Secondly, since the present invention does not require additional parts or components, a cost of materials can be prevented from rising.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital device comprising:
   a first illumination unit configured to generate a first light;
   a second illumination unit configured to generate a second light;
   a first camera unit;
   a second camera unit; and
   a control unit configured to:
   check whether a brightness of an image obtained from the first camera unit is equal to or greater than a reference value or whether a driver is detected from an image obtained from the second camera unit, and check whether a brightness of an image obtained from the second camera unit is equal to or greater than a reference value or whether the driver is detected from an image obtained from the first camera unit,
   if the brightness of the image obtained from the first camera unit is not equal to or greater than the reference value or if the driver is not detected from the image obtained from the second camera unit, obtaining a first comparative image from the first camera unit by turning off the second illumination unit and obtaining a second comparative image from the first camera unit by turning on the second illumination unit, and if the brightness of the image obtained from the second camera unit is less than the reference value or if the driver is not detected from the image obtained from the first camera unit, obtaining a third comparative image from the second camera unit by turning off the first illumination unit and obtaining a fourth comparative image from the second camera unit by turning on the first illumination unit,
   check whether a difference value between the brightness of the first comparative image and the brightness of the second comparative image is equal to or greater than a reference difference value, and check whether a difference value between the brightness of the third comparative image and the brightness of the fourth comparative image is equal to or greater than a reference difference value, and
   if the difference value between the brightness of the obtained first comparative image and the brightness of the obtained second comparative image is not equal to or greater than the reference difference value, turning off the second illumination unit, and if the difference value between the brightness of the obtained third comparative image and the brightness of the obtained fourth comparative image is less than the reference difference value, turning off the first illumination unit.

2. The digital device of claim 1, wherein the first camera unit is disposed adjacent to the first illumination unit, and wherein the second camera unit is disposed adjacent to the second illumination unit.

3. The digital device of claim 1, wherein the first illumination unit and the first camera are configured as a first module, and
   wherein the second illumination unit and the second camera are configured as a second module.

4. The digital device of claim 1, wherein each of the first light generated from the first illumination unit and the second light generated from the second illumination unit comprises a light of an infrared wavelength range.

5. The digital device of claim 1, wherein an intensity of the first light generated from the first illumination unit is equal to that of the second light generated from the second illumination unit.

6. The digital device of claim 1, further comprising:
   a storage unit configured to store the reference value for the image brightness and the reference difference value,
   wherein the reference value and the reference difference value are preset.

7. A method of controlling a digital device for monitoring a driver, the digital device including a first illumination unit, a second illumination unit, a first camera unit and a second camera unit, the method comprising:
   obtaining images from the first camera unit and the second camera unit;
   checking, via a control unit of the digital device, whether a brightness of the image obtained from the first camera unit is equal to or greater than a reference value or whether the driver is detected from the image obtained from the second camera unit, and checking, via the control unit of the digital device, whether a brightness of the image obtained from the second camera unit is equal to or greater than a reference value or whether the driver is detected from the image obtained from the first camera unit;
   if the brightness of the image obtained from the first camera unit is not equal to or greater than the reference value or the driver is not detected from the image obtained from the second camera unit, obtaining a first comparative image from the first camera unit by turning off the second illumination unit and a second comparative image from the first camera unit by turning on the second illumination unit, and if the brightness of the image obtained from the second camera unit is less than the reference value or the driver is not detected from the image obtained from the first camera unit, obtaining a third comparative image from the second camera unit by turning off the first illumination unit and a fourth comparative image from the second camera unit by turning on the first illumination unit;
   checking whether a difference value between a brightness of the obtained first comparative image and a brightness of the obtained second comparative image is equal to or greater than a reference difference value, and checking whether a difference value between a brightness of the obtained third comparative image and a brightness of the obtained fourth comparative image is equal to or greater than a reference difference value; and
   if the difference value between the brightness of the obtained first comparative image and the brightness of the obtained second comparative image is not equal to or greater than the reference difference value, turning off the second illumination unit, and if the difference value between the brightness of the obtained third comparative image and the brightness of the obtained fourth comparative image is less than the reference difference value, turning off the first illumination unit.

8. The method of claim 7, further comprising:
   receiving a driver monitoring request signal; and
   turning on the first illumination unit, the second illumination unit, the first camera unit and the second camera unit.

9. The method of claim 7, wherein the reference value for the image brightness is preset and saved.

10. The method of claim 9, wherein the reference value for the image brightness is determined depending on an internal vehicle environment of the driver.

11. The method of claim 7, wherein a timing point of turning off the second illumination unit and a timing point of turning on the second illumination unit have a predetermined time interval.

12. The method of claim 11, wherein the predetermined time interval comprises a time for obtaining the first comparative image from the first camera unit.

13. The method of claim 7, wherein the reference difference value is preset and saved.

14. The method of claim 7, further comprising:
checking whether both of the first illumination unit and the second illumination unit are turned off; and
if both of the first illumination unit and the second illumination unit are turned off, displaying a warning to the driver and turning on both of the first illumination unit and the second illumination unit.

15. The method of claim 14, wherein the warning is displayed by displaying a created warning message on a display unit or turning on/off a warning notification illumination continuously for a predetermined time.

16. The method of claim 14, further comprising:
turning on both of the first illumination unit and the second illumination unit after an elapse of a predetermined time from a timing point of displaying the warning to the driver.

17. The method of claim 14, further comprising:
if both of the first illumination unit and the second illumination unit are not turned off, obtaining the images from the first camera unit and the second camera unit;
checking whether the driver is detected from each of the images obtained from the first camera unit and the second camera unit; and
if the driver is detected from each of the images obtained from the first camera unit and the second camera unit, turning on the second illumination unit.

18. The method of claim 17, wherein if the driver is not detected from each of the images obtained from the first camera unit and the second camera unit, turning off the second illumination and repeatedly performing the steps following the step of turning off the second illumination.

19. The method of claim 7, wherein the checking whether the difference value is equal to or greater than the reference difference value, comprises:
if the difference value between the brightness of the obtained first comparative image and the brightness of the obtained second comparative image is equal to or greater than the reference difference value, checking whether both of the first illumination unit and the second illumination unit are turned off; and
if both of the first illumination unit and the second illumination unit are turned off, displaying a warning to the driver and turning on both of the first illumination unit and the second illumination unit.

20. The method of claim 7, wherein the checking whether the difference value is equal to or greater than the reference difference value comprises:
if the difference value between the brightness of the obtained first comparative image and the brightness of the obtained second comparative image is equal to or greater than the reference difference value, obtaining the images from the first camera unit and the second camera unit;
checking whether the driver is detected from each of the images obtained from the first camera unit and the second camera unit; and
if the driver is detected from each of the images obtained from the first camera unit and the second camera unit, turning on the second illumination unit.

* * * * *